(12) United States Patent
Nagai et al.

(10) Patent No.: US 11,152,154 B2
(45) Date of Patent: Oct. 19, 2021

(54) ELECTRONIC COMPONENT

(71) Applicant: TDK CORPORATION, Tokyo (JP)

(72) Inventors: Yuichi Nagai, Tokyo (JP); Atsushi Takeda, Tokyo (JP); Takehisa Tamura, Tokyo (JP); Shinya Onodera, Tokyo (JP)

(73) Assignee: TDK CORPORATION, Tokyo (JP)

( * ) Notice: Subject to any disclaimer, the term of this patent is extended or adjusted under 35 U.S.C. 154(b) by 8 days.

(21) Appl. No.: 16/820,138

(22) Filed: Mar. 16, 2020

(65) Prior Publication Data

US 2020/0312563 A1    Oct. 1, 2020

(30) Foreign Application Priority Data

Mar. 25, 2019 (JP) .............................. JP2019-056112

(51) Int. Cl.
*H01G 4/232* (2006.01)
*H01G 4/248* (2006.01)
*H01G 4/30* (2006.01)

(52) U.S. Cl.
CPC ........... *H01G 4/2325* (2013.01); *H01G 4/248* (2013.01); *H01G 4/30* (2013.01)

(58) Field of Classification Search
None
See application file for complete search history.

(56) References Cited

U.S. PATENT DOCUMENTS

| 10,026,556 B2* | 7/2018 | Ando | H01G 4/30 |
| 10,510,486 B2* | 12/2019 | Yamada | H01G 4/232 |
| 10,964,479 B2* | 3/2021 | Onodera | H01G 4/248 |
| 2008/0073108 A1* | 3/2008 | Saito | H01G 4/005 174/256 |
| 2013/0182368 A1* | 7/2013 | Jeon | H01G 4/005 361/301.4 |
| 2013/0182369 A1* | 7/2013 | Jeon | H01G 4/2325 361/301.4 |
| 2013/0242457 A1 | 9/2013 | Lee et al. | |

(Continued)

FOREIGN PATENT DOCUMENTS

CN    103310977 A    9/2013
CN    106971846 A    7/2017

(Continued)

*Primary Examiner* — Dion Ferguson
(74) *Attorney, Agent, or Firm* — Oliff PLC

(57) ABSTRACT

An electronic component includes an element body and an external electrode. The element body includes a side surface and an end surface. The external electrode includes a conductive resin layer disposed over the side surface and the end surface. The conductive resin layer includes a first region positioned on the end surface, a second region positioned on the side surface, and a third region positioned on a ridge portion between the end surface and the side surface. In a case where a maximum thickness of the first region is T1 (μm), a maximum thickness of the second region is T2 (μm), and a minimum thickness of the third region is T3 (μm), the maximum thickness T1 and the maximum thickness T2 satisfy a relation of $$T2/T1 \geq 0.11,$$

and the maximum thickness T1 and the minimum thickness T3 satisfy a relation of $$T3/T1 \geq 0.11.$$

21 Claims, 10 Drawing Sheets

(56) References Cited

U.S. PATENT DOCUMENTS

| | | | | |
|---|---|---|---|---|
| 2016/0020028 A1* | 1/2016 | Katsuta | ............... | H01G 4/0085 |
| | | | | 361/301.4 |
| 2016/0027583 A1 | 1/2016 | Ahn et al. | | |
| 2017/0098505 A1* | 4/2017 | Ando | ..................... | H01G 4/232 |
| 2017/0098506 A1 | 4/2017 | Ando et al. | | |
| 2017/0186538 A1* | 6/2017 | Ando | ....................... | H01G 4/30 |
| 2017/0294268 A1* | 10/2017 | Katsuta | .................. | H01G 4/012 |
| 2017/0301468 A1 | 10/2017 | Kim et al. | | |
| 2017/0345553 A1 | 11/2017 | Shimoyasu et al. | | |
| 2019/0189349 A1 | 6/2019 | Kim et al. | | |
| 2019/0206625 A1 | 7/2019 | Kim et al. | | |
| 2019/0304683 A1* | 10/2019 | Terashita | ............... | H01G 2/065 |
| 2020/0098523 A1* | 3/2020 | Shin | ................... | H01G 4/248 |
| 2020/0185144 A1 | 6/2020 | Shimoyasu et al. | | |
| 2020/0312550 A1* | 10/2020 | Nagai | ..................... | H01G 4/33 |

FOREIGN PATENT DOCUMENTS

| | | | |
|---|---|---|---|
| CN | 107301918 A | 10/2017 | |
| CN | 107452464 A | 12/2017 | |
| JP | H5-144665 A | 6/1993 | |
| JP | 2017-120819 A | 7/2017 | |
| KR | 10-2016-0012830 A | 2/2016 | |
| KR | 10-2017-0135726 A | 12/2017 | |

\* cited by examiner

Fig.8

| SAMPLE | 1 | 2 | 3 | 4 | 5 | 6 | 7 | 8 | 9 | 10 | 11 |
|---|---|---|---|---|---|---|---|---|---|---|---|
| T1 (μm) | 58 | 80 | 118 | 120 | 122 | 121 | 121 | 125 | 127 | 102 | 94 |
| T2 (μm) | 23 | 9 | 13 | 13 | 15 | 16 | 17 | 25 | 43 | 52 | 51 |
| T3 (μm) | 5 | 6 | 12 | 13 | 15 | 14 | 15 | 32 | 26 | 37 | 40 |
| T4 (μm) | 5 | 10 | 14 | 12 | 13 | 31 | 47 | 33 | 53 | 54 | 52 |
| T2/T1 | 0.40 | 0.11 | 0.11 | 0.11 | 0.12 | 0.13 | 0.14 | 0.20 | 0.34 | 0.51 | 0.54 |
| T3/T1 | 0.08 | 0.08 | 0.10 | 0.11 | 0.12 | 0.12 | 0.13 | 0.26 | 0.20 | 0.36 | 0.43 |
| T4/T1 | 0.09 | 0.13 | 0.12 | 0.10 | 0.11 | 0.26 | 0.39 | 0.26 | 0.42 | 0.53 | 0.55 |
| INCIDENCE RATIO OF PEEL-OFF | 100% | 50% | 25% | 5% | 3% | 0% | 0% | 0% | 0% | 0% | 4% |

ELECTRONIC COMPONENT

BACKGROUND OF THE INVENTION

1. Field of the Invention

The present invention relates to an electronic component.

2. Description of Related Art

Known electronic components include an element body including a side surface and an end surface adjacent to each other and an external electrode disposed in the side surface and the end surface (for example, refer to Japanese Unexamined Patent Publication No. H5-144665). The external electrode includes a conductive resin layer disposed over the side surface and the end surface, and a plating layer covering the conductive resin layer.

SUMMARY OF THE INVENTION

The conductive resin layer generally contains a resin and conductive particles. The resin tends to absorb moisture. In a case in which the electronic component is solder-mounted on an electronic device, the moisture absorbed by the resin may be gasified so that volume expansion may occur. In this case, stress may act on the conductive resin layer, and the conductive resin layer may be cracked and be peeled off. The conductive particles include, for example, metal. The electronic device includes, for example, a circuit board or an electronic component.

An object of an aspect of the present invention is to provide an electronic component that controls peel-off of a conductive resin layer.

An electronic component according to an aspect of the present invention includes an element body including a side surface and an end surface adjacent to each other, and an external electrode disposed on the side surface and the end surface. The external electrode includes a conductive resin layer disposed over the side surface and the end surface, and a plating layer covering the conductive resin layer. The conductive resin layer includes a first region positioned on the end surface, a second region positioned on the side surface, and a third region positioned on a ridge portion between the end surface and the side surface. In a case where a maximum thickness of the first region is T1 (μm), a maximum thickness of the second region is T2 (μm), and a minimum thickness of the third region is T3 (μm), the maximum thickness T1 and the maximum thickness T2 satisfy a relation of $T2/T1 \geq 0.11$, and the maximum thickness T1 and the minimum thickness T3 satisfy a relation of $T3/T1 \geq 0.11$.

As a result of research and study by the present inventors, the present inventors have discovered the following matters.

The plating layer covering the conductive resin layer tends to be in cohesive contact with the conductive resin layer, but tends not to be in cohesive contact with the element body. Therefore, a gap is formed between an end edge of the plating layer and the element body. In a case where the moisture absorbed by the resin is gasified, the gas generated from the moisture reaches the gap between the end edge of the plating layer and the element body, and the gas is emitted outside the external electrode through the gap. Since the gas generated from the moisture is emitted outside the external electrode, stress tends not to act on the conductive resin layer. Hereinafter, the gap between the end edge of the plating layer and the element body is referred to as a "gap" simply.

The inventors conducted further research and study on a configuration in which the gas generated from the moisture reaches the gap reliably.

The second region of the conductive resin layer is close to the gap, and thus the gas generated from the moisture absorbed by the resin of the second region tends to reach the gap. Since the first region is away from the gap, the gas generated from the moisture absorbed by the resin of the first region tends not to reach the gap. In order to emit, outside the external electrode, the gas generated from the moisture absorbed by the resin of the first region, it is desired to achieve a configuration in which the gas generated from the moisture absorbed by the resin of the first region reaches the gap reliably. In a case in which the gas generated from the moisture absorbed by the resin of the first region reaches the gap reliably, the gas generated from the moisture absorbed by the resin of the second region also reaches the gap reliably.

The inventors focused on a path through which the gas generated from the moisture absorbed by the resin of the first region reaches the gap. Consequently, the inventors found out that the gas generated from the moisture absorbed by the resin of the first region reaches the gap reliably in a case where a desired relation holds between a thickness of the first region, a thickness of the second region, and a thickness of the third region. Specifically, in a case where the maximum thickness T1 of the first region and the maximum thickness T2 of the second region satisfy the relation of $T2/T1 \geq 0.11$, and the maximum thickness T1 and the minimum thickness T3 of the third region satisfy the relation of $T3/T1 \geq 0.11$, the gas generated from the moisture absorbed by the resin of the first region passes through the third region and the second region to reach the gap reliably.

Therefore, in the above-described aspect, the gas generated from the moisture absorbed by the resin of the conductive resin layer (the first region) reaches the gap reliably. The gas that has reached the gap is emitted outside the external electrode, so that the stress tends not to act on the conductive resin layer. Consequently, the above-described aspect controls the peel-off of the conductive resin layer.

In the above-described aspect, the maximum thickness T1 and the maximum thickness T2 may satisfy a relation of $T2/T1 \geq 0.13$.

This configuration controls the peel-off of the conductive resin layer reliably.

In the above-described aspect, the maximum thickness T1 and the minimum thickness T3 may satisfy a relation of $T3/T1 \geq 0.12$.

This configuration controls the peel-off of the conductive resin layer reliably.

In the above-described aspect, the maximum thickness T1 and the maximum thickness T2 may satisfy a relation of $T2/T1 \leq 0.54$.

As a result of research and study by the present inventors, the present inventors also have discovered the following matters.

The gap is an outlet of the gas generated from the moisture absorbed by the resin of the conductive resin layer, and is also an inlet of moisture to the external electrode. The path through which the gas generated from the moisture absorbed by the resin of the first region reaches the gap may serve as a path through which the moisture reaches the first region. The moisture that has reached the first region is absorbed in the first region. In this case, the gas generation amount may increase. Therefore, in order to reduce the absorption of the moisture in the first region, it is desired to achieve a configuration in which the moisture tends not to reach the first region.

The inventors found out that the moisture tends not to reach the first region in a case where a desired relation holds between the thickness of the first region and the thickness of the second region. Specifically, in the maximum thickness T1 and the maximum thickness T2 satisfy a relation of $$T2/T1 \leq 0.54,$$

the moisture tends not to reach the first region even in a case in which the moisture enters from the gap. Therefore, this configuration reduces an increase in moisture absorbed in the conductive resin layer (the first region) and an increase in gas generated from the moisture. Consequently, this configuration further controls the peel-off of the conductive resin layer.

In the above-described aspect, the maximum thickness T1 and the minimum thickness T3 may satisfy a relation of $$T3/T1 \leq 0.43.$$

The inventors also found out that the moisture tends not to reach the first region in a case where a desired relation holds between the thickness of the first region and the thickness of the third region. Specifically, in a configuration where the maximum thickness T1 and the minimum thickness T3 satisfy the relation of $$T3/T1 \leq 0.43,$$

the moisture tends not to reach the first region even in a case in which the moisture enters from the gap. Therefore, this configuration reduces an increase in moisture absorbed in the conductive resin layer (the first region) and an increase in gas generated from the moisture. Consequently, this configuration further controls the peel-off of the conductive resin layer.

The above-described aspect may include a circuit element disposed in the element body. The element body may include a first portion where the circuit element is disposed and a second portion where the circuit element is not disposed. In a case where the first region has a thickness of T4 (µm) at a position corresponding to a boundary between the first portion and the second portion, the maximum thickness T1 and the thickness T4 may satisfy a relation of $$T4/T1 \geq 0.11.$$

As a result of research and study by the present inventors, the present inventors also have discovered the following matters.

In order to make the gas generated from the moisture absorbed by the resin of the first region reach the gap more reliably, it is desired to achieve a configuration in which the gas reaches the second region more reliably from the first region. The position, in the first region, corresponding to the boundary between the first portion and the second portion is a position near an end of the first region and is near the third region. Therefore, in a case in which the gas tends to pass through the position, in the conductive resin layer, corresponding to the boundary between the first portion and the second portion, the gas tends to reach the third region from the first region.

The inventors focused on the thickness of the first region at the position corresponding to the boundary between the first portion and the second portion. Consequently, the inventors found out that the gas reaches the third region from the first region more reliably in a case where the thickness of the first region and the thickness of the first region at the position corresponding to the boundary between the first portion and the second portion satisfy a desired relation. Specifically, in a case where the maximum thickness T1 and the thickness T4 of the conductive resin layer at the position corresponding to the boundary satisfy the relation of $$T4/T1 \geq 0.11,$$

the gas reaches the third region from the first region more reliably. In this configuration, the gas generated from the moisture absorbed by the resin of the conductive resin layer (the first region) reaches the gap more reliably. Therefore, the stress further tends not to act on the conductive resin layer. Consequently, this configuration further controls the peel-off of the conductive resin layer.

In the above-described aspect, the maximum thickness T1 and the thickness T4 described above may satisfy a relation of $$T4/T1 \geq 0.26.$$

This configuration controls the peel-off of the conductive resin layer reliably.

In the above-described aspect, the maximum thickness T1 and the thickness T4 may satisfy a relation of $$T4/T1 \leq 0.55.$$

As a result of research and study by the present inventors, the present inventors also have discovered the following matters.

As described above, the path through which the gas generated from the moisture absorbed by the resin of the first region reaches the gap may serve as a path through which the moisture reaches the first region. Therefore, in order to reduce the absorption of the moisture in the first region, it is desired to achieve a configuration in which the moisture tends not to reach the first region.

The inventors found out that the moisture tends not to reach the first region in a case where the thickness of the first region and the thickness of the first region at the position corresponding to the boundary between the first portion and the second portion satisfy a desired relation. Specifically, in a configuration where the maximum thickness T1 and the above-described thickness T4 satisfy the relation of $$T4/T1 \leq 0.55,$$

the moisture tends not to reach the first region even in a case in which the moisture enters from the gap. Therefore, this configuration reduces an increase in moisture absorbed in the conductive resin layer (the first region) and an increase in gas generated from the moisture. Consequently, this configuration further controls the peel-off of the conductive resin layer.

In the above-described aspect, the maximum thickness T2, the minimum thickness T3, and the thickness T4 may satisfy a relation of $$T4 > T2$$

and a relation of $$T4 > T3.$$

Furthermore, the inventors also found out that the gas reaches the second region from the first region more reliably in a case where the thickness of the first region at the position corresponding to the boundary between the first portion and the second portion, the thickness of the second region, and the thickness of the third region satisfy a desired relation. Specifically, in a case where the maximum thickness T2, the minimum thickness T3, and the thickness T4 satisfy the relation of $$T4>T2$$

and the relation of $$T4>T3,$$

the gas reaches the second region from the first region more reliably. In this configuration, the gas generated from the moisture absorbed by the resin of the conductive resin layer (the first region) reaches the gap more reliably. Therefore, the stress tends not to act on the conductive resin layer. Consequently, this configuration further controls the peel-off of the conductive resin layer.

In the above-described aspect, in a cross-section orthogonal to the side surface and the end surface, a surface of the second region may curve in a convex shape in a direction away from the side surface.

In this configuration, since the thickness of the second region tends not to be small locally, a movement path of the gas in the second region tends not to be narrow on the movement path. Therefore, this configuration tends not to suppress the movement of the gas in the second region. The gas generated from the moisture absorbed by the resin of the conductive resin layer reaches the gap more reliably. Consequently, this configuration controls the peel-off of the conductive resin layer more reliably.

In the above-described aspect, the external electrode may include a sintered metal layer that is disposed over the side surface and the end surface and is covered with the conductive resin layer. With a plane including the end surface as a reference plane, a length from an end edge of the sintered metal layer to an end edge of the second region in a direction orthogonal to the end surface may be larger than a length from the reference plane to the end edge of the sintered metal layer in the direction orthogonal to the end surface.

As a result of research and study by the present inventors, the present inventors also have discovered the following matters.

The degree of cohesive contact between the element body and the conductive resin layer is lower than the degree of cohesive contact between the sintered metal layer and the conductive resin layer. Therefore, an interface between the sintered metal layer and the conductive resin layer tends not to contribute to the movement path of the gas, and an interface between the element body and the conductive resin layer tends to contribute as the movement path of the gas.

The inventors focused on a length of the interface between the sintered metal layer and the conductive resin layer, and a length of the interface between the element body and the conductive resin layer. Consequently, the inventors found out that the movement path of the gas increases in a case where a desired relation holds between the length from the reference plane to the end edge of the sintered metal layer in the direction orthogonal to the end surface and the length from the end edge of the sintered metal layer to the end edge of the second region in the direction orthogonal to the end surface. The movement path of the gas increases in a case where the length from the end edge of the sintered metal layer to the end edge of the second region in the direction orthogonal to the end surface is larger than the length from the reference plane to the end edge of the sintered metal layer in the direction orthogonal to the end surface. Therefore, in this configuration, the gas generated from the moisture absorbed by the resin of the conductive resin layer tends to move toward the gap. The stress further tends not to act on the conductive resin layer. Consequently, this configuration further controls the peel-off of the conductive resin layer.

In the above-described aspect, when viewed from a direction orthogonal to the side surface, an end edge of the second region may curve.

In this configuration, the length of the end edge of the second region is larger than that of a configuration in which the end edge of the second region has a linear shape. Therefore, in this configuration, a region from which the gas is emitted is large, and the gas further tends to be emitted from the external electrode. Consequently, the stress further tends not to act on the conductive resin layer.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 8 is a table illustrating an incidence ratio of peel-off of the second electrode layer in each of samples;

DETAILED DESCRIPTION OF EMBODIMENTS

Figure 1:
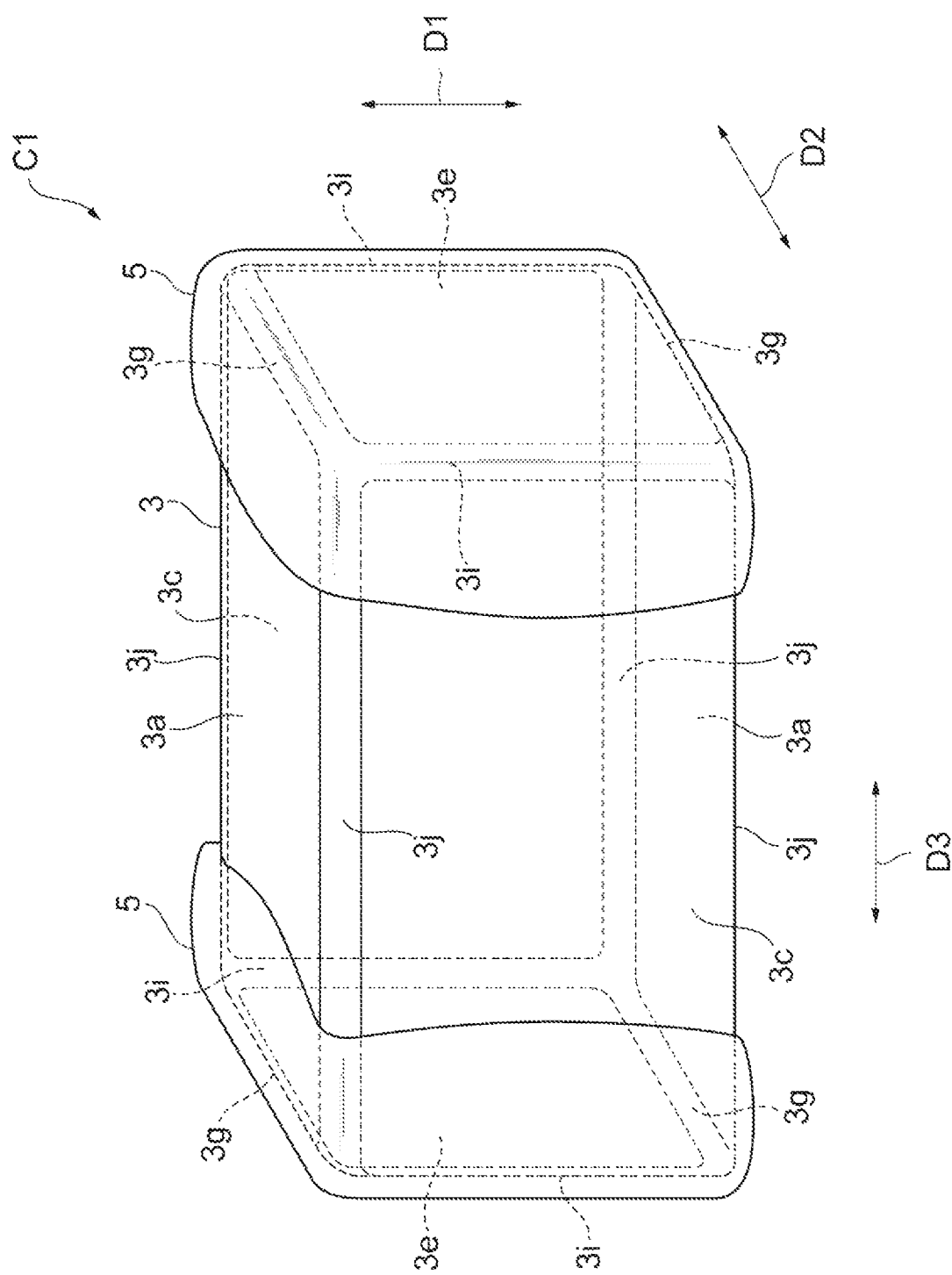
FIG. 1 is a perspective view of a multilayer capacitor according to an embodiment.

Hereinafter, embodiments of the present invention will be described in detail with reference to the accompanying drawings. In the following description, the same elements or elements having the same functions are denoted with the same reference numerals and overlapped explanation is omitted.

Figure 2:
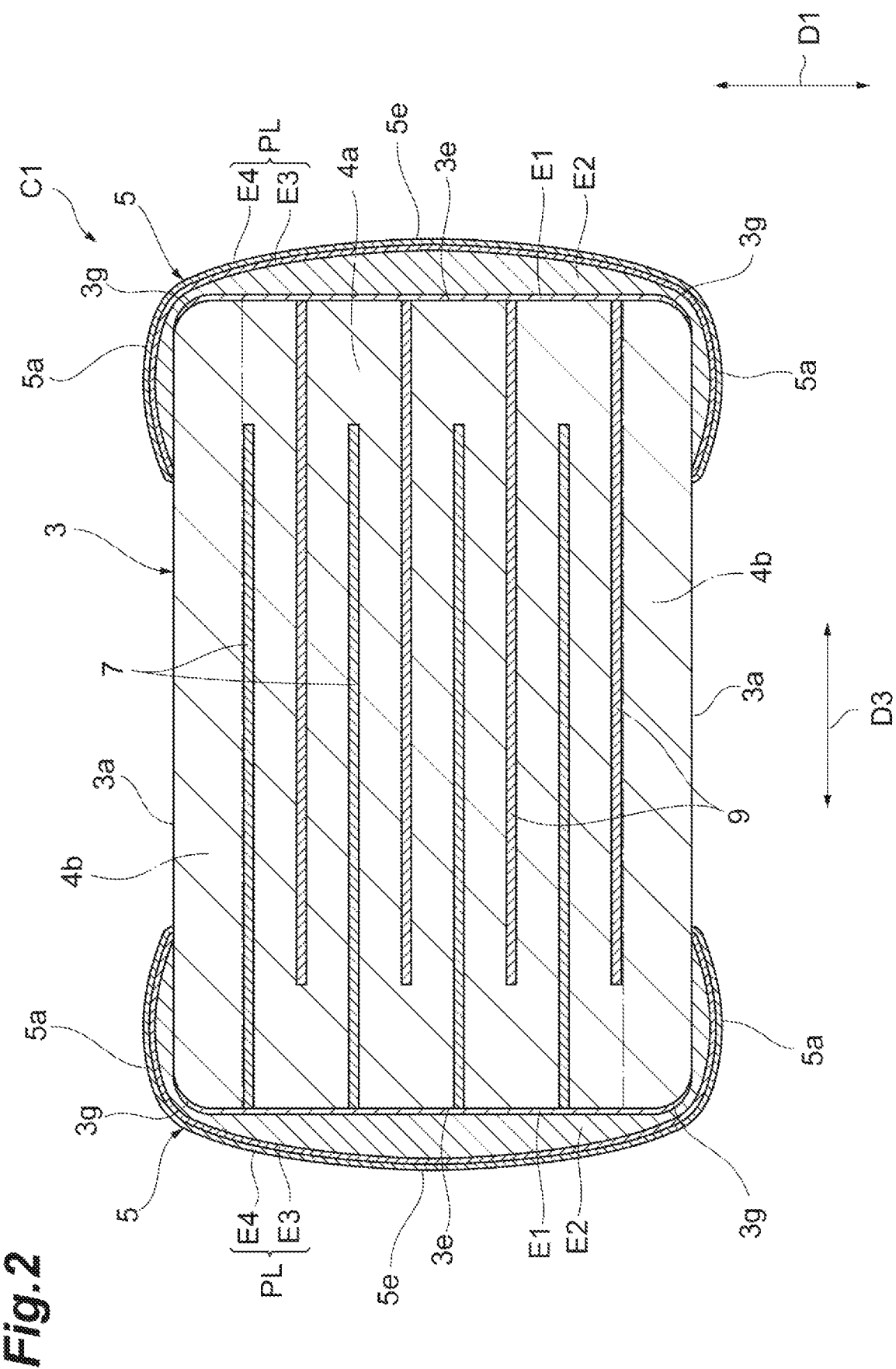
FIG. 2 is a view illustrating a cross-sectional configuration of the multilayer capacitor according to the embodiment.
Figure 3:
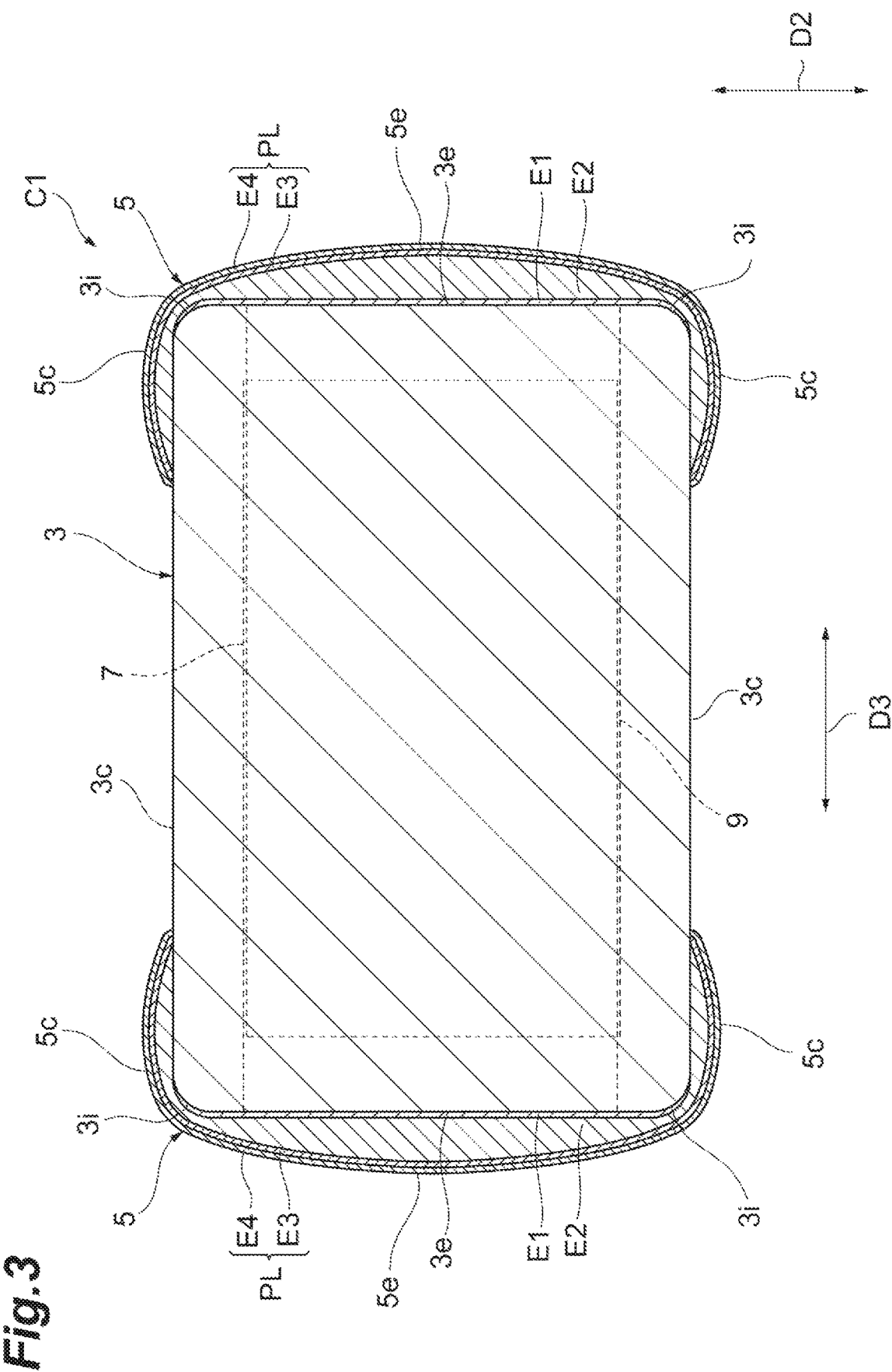
FIG. 3 is a view illustrating a cross-sectional configuration of the multilayer capacitor according to the embodiment.
Figure 4:
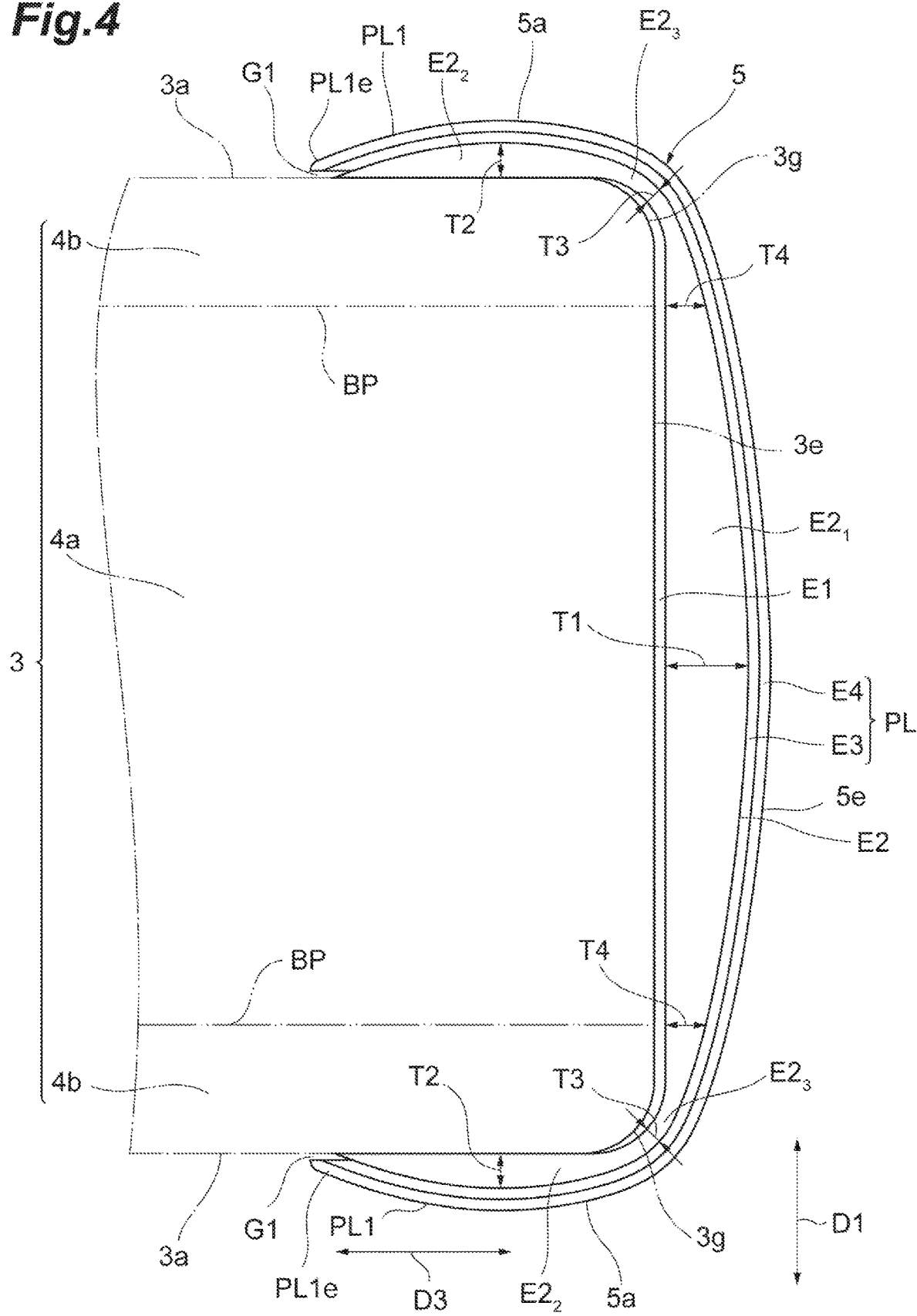
FIG. 4 is a view illustrating a cross-sectional configuration of an external electrode.
Figure 5:
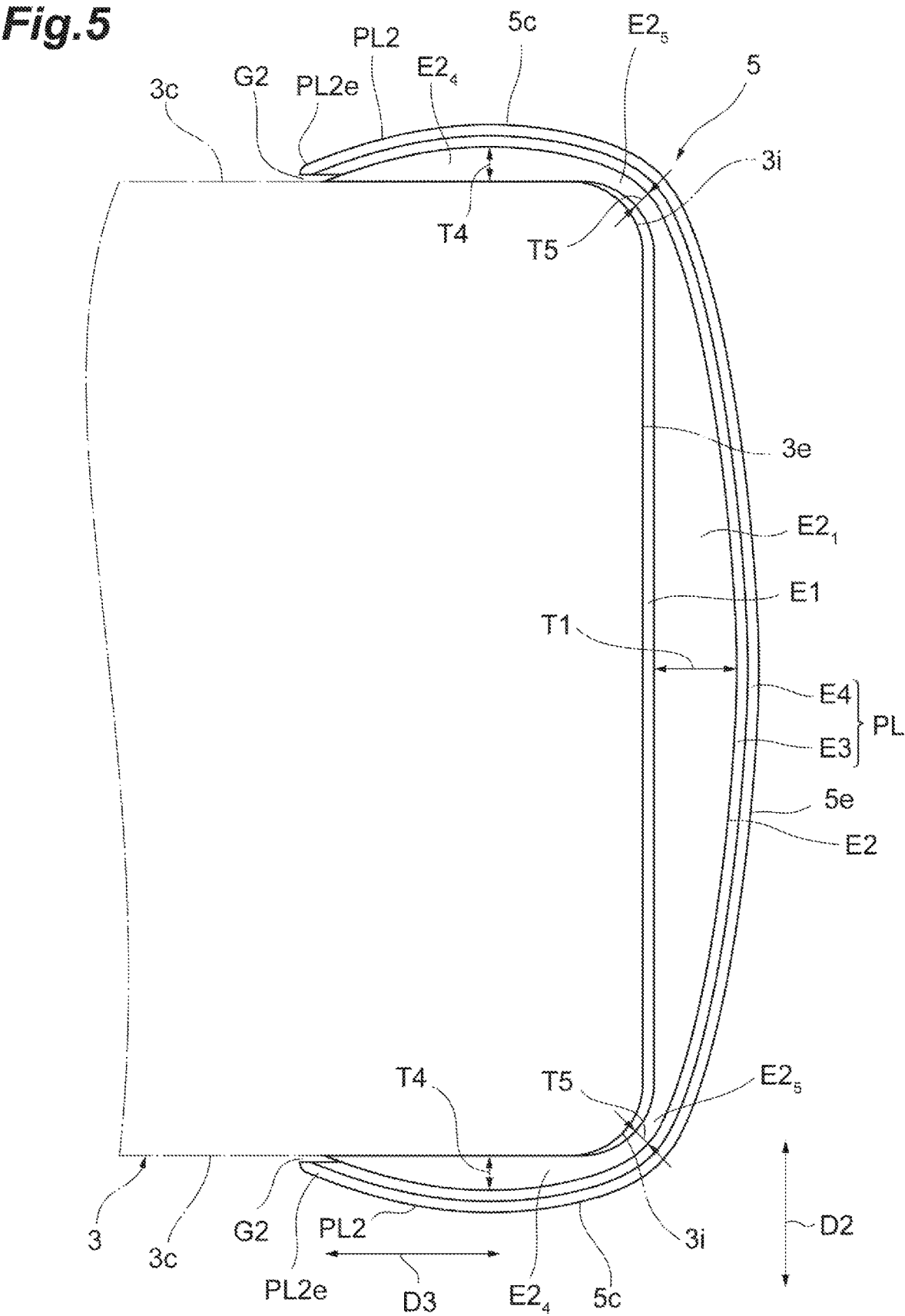
FIG. 5 is a view illustrating a cross-sectional configuration of the external electrode.
Figure 6:
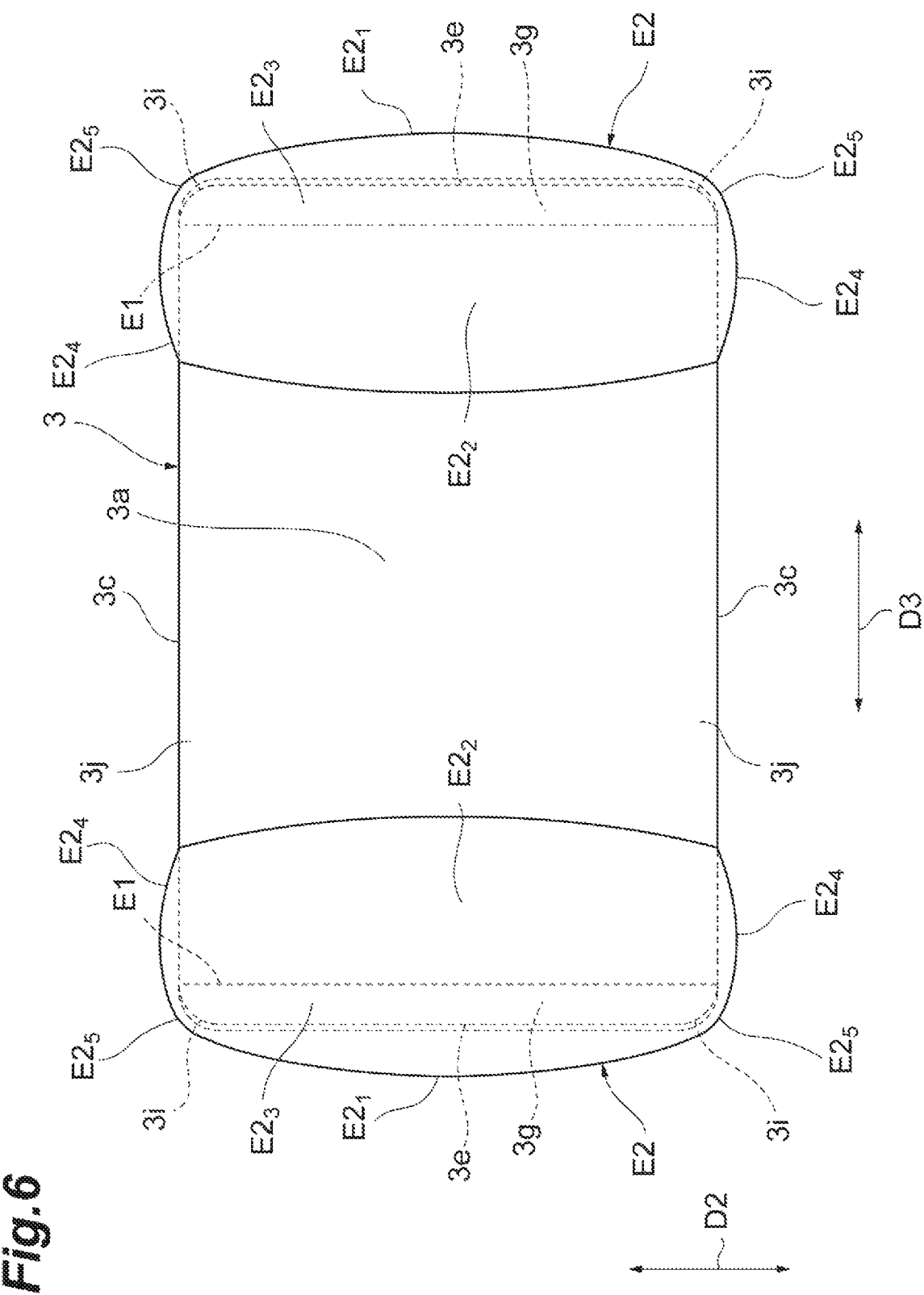
FIG. 6 is a plan view illustrating an element body and a second electrode layer.
Figure 7:
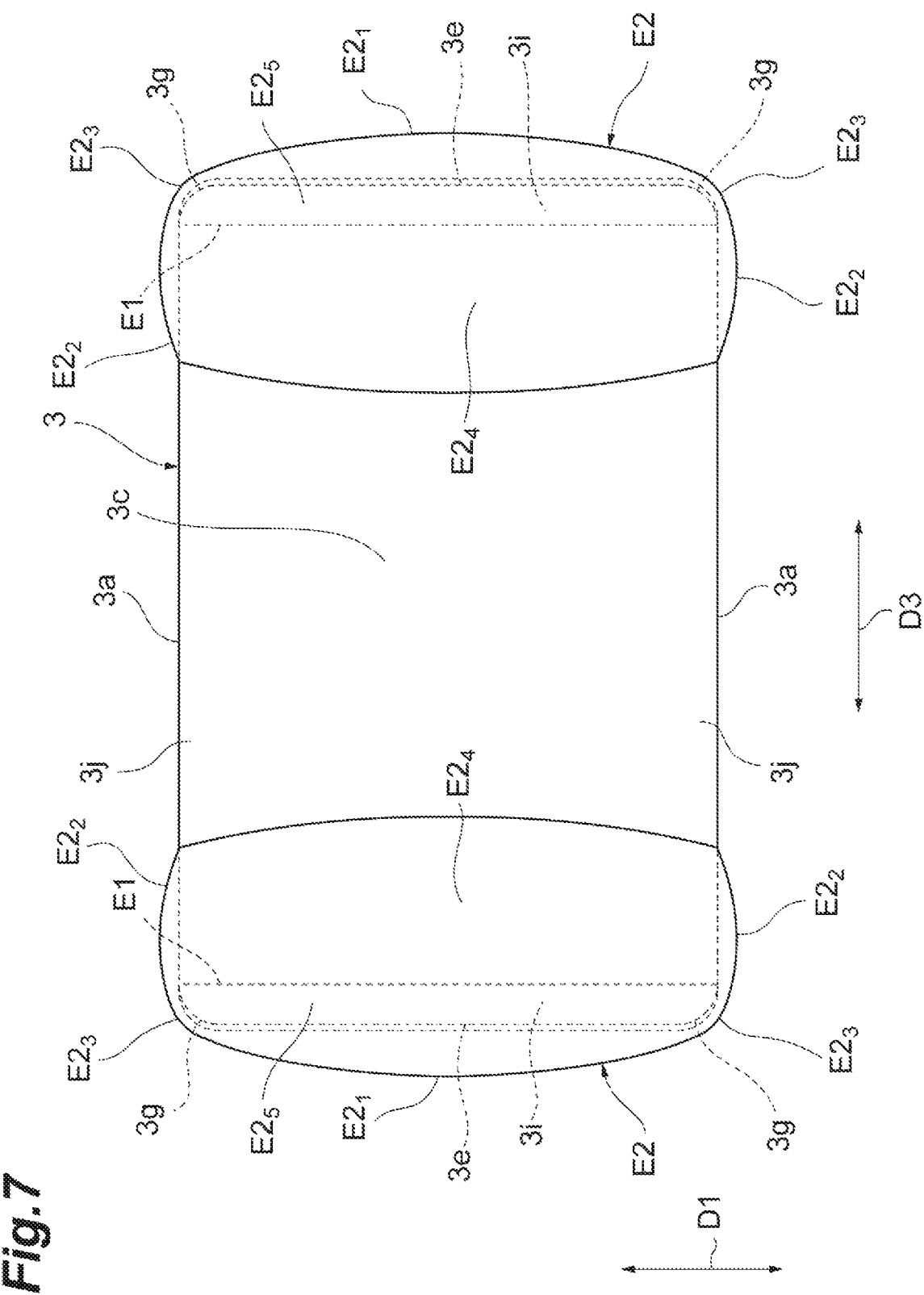
FIG. 7 is a plan view illustrating the element body and the second electrode layer.

A configuration of a multilayer capacitor C1 according to an embodiment will be described with reference to FIGS. 1 to 7. FIG. 1 is a perspective view of a multilayer capacitor according to the embodiment. FIGS. 2 and 3 are views illustrating a cross-sectional configuration of the multilayer capacitor according to the embodiment. FIGS. 4 and 5 are views illustrating a cross-sectional configuration of an external electrode. FIGS. 6 and 7 are plan views illustrating an element body and a second electrode layer. In the present embodiment, an electronic component is, for example, the multilayer capacitor C1.

As illustrated in FIG. 1, the multilayer capacitor C1 includes an element body 3 of a rectangular parallelepiped shape and a plurality of external electrodes 5. In the present embodiment, the multilayer capacitor C1 includes a pair of external electrodes 5. The pair of external electrodes 5 is disposed on the element body 3. The pair of external electrodes 5 is separated from each other. The rectangular parallelepiped shape includes a rectangular parallelepiped shape in which corners and ridges are chamfered, and a rectangular parallelepiped shape in which the corners and ridges are rounded.

The element body 3 includes a pair of principal surfaces 3a opposing each other, a pair of side surfaces 3c opposing each other, and a pair of end surfaces 3e opposing each other. The pair of principal surfaces 3a, the pair of side surfaces 3c, and the pair of end surfaces 3e have a rectangular shape. The direction in which the pair of principal surfaces 3a opposes each other is a first direction D1. The direction in which the pair of side surfaces 3c opposes each other is a second direction D2. The direction in which the pair of end surfaces 3e opposes each other is a third direction D3. The multilayer capacitor C1 is solder-mounted on an electronic device. The electronic device includes, for example, a circuit board or an electronic component. One principal surface 3a of the multilayer capacitor C1 opposes the electronic device. The one principal surface 3a is arranged to constitute a mounting surface. The one principal surface 3a is the mounting surface. Each of the principal surface 3a is also a side surface included in the element body 3 of the rectangular parallelepiped shape.

The first direction D1 is a direction orthogonal to the respective principal surfaces 3a and is orthogonal to the second direction D2. The third direction D3 is a direction parallel to the respective principal surfaces 3a and the respective side surfaces 3c, and is orthogonal to the first direction D1 and the second direction D2. The second direction D2 is a direction orthogonal to the respective side surfaces 3c. The third direction D3 is a direction orthogonal to the respective end surfaces 3e. In the present embodiment, a length of the element body 3 in the third direction D3 is larger than a length of the element body 3 in the first direction D1, and larger than a length of the element body 3 in the second direction D2. The third direction D3 is a longitudinal direction of the element body 3. The length of the element body 3 in the first direction D1 and the length of the element body 3 in the second direction D2 may be equivalent to each other. The length of the element body 3 in the first direction D1 and the length of the element body 3 in the second direction D2 may be different from each other.

The length of the element body 3 in the first direction D1 is a height of the element body 3. The length of the element body 3 in the second direction D2 is a width of the element body 3. The length of the element body 3 in the third direction D3 is a length of the element body 3. In the present embodiment, the element body 3 has a height of 0.5 to 2.5 mm, a width of 0.5 to 5.0 mm, and a length of 1.0 to 5.7 mm. The element body 3 has, for example, a height of 2.5 mm, a width of 2.5 mm, and a length of 3.2 mm.

The pair of side surfaces 3c extends in the first direction D1 to couple the pair of principal surfaces 3a. The pair of side surfaces 3c also extends in the third direction D3. The pair of end surfaces 3e extends in the first direction D1 to couple the pair of principal surfaces 3a. The pair of end surfaces 3e extends in the second direction D2.

The element body 3 includes four ridge portions 3g, four ridge portions 3i, and four ridge portions 3j. The ridge portion 3g is positioned between the end surface 3e and the principal surface 3a. The ridge portion 3i is positioned between the end surface 3e and the side surface 3c. The ridge portion 3j is positioned between the principal surface 3a and the side surface 3c. In the present embodiment, each of the ridge portions 3g, 3i, and 3j is rounded to curve. The element body 3 is subject to what is called a round chamfering process. The end surface 3e and the principal surface 3a are indirectly adjacent to each other with the ridge portion 3g between the end surface 3e and the principal surface 3a. The end surface 3e and the side surface 3c are indirectly adjacent to each other with the ridge portion 3i between the end surface 3e and the side surface 3c. The principal surface 3a and the side surface 3c are indirectly adjacent to each other with the ridge portion 3j between the principal surface 3a and the side surface 3c.

The element body 3 is configured by laminating a plurality of dielectric layers in the first direction D1. The element body 3 includes the plurality of laminated dielectric layers. In the element body 3, a lamination direction of the plurality of dielectric layers coincides with the first direction D1. Each dielectric layer includes, for example, a sintered body of a ceramic green sheet containing a dielectric material. The dielectric material includes, for example, a dielectric ceramic of $BaTiO_3$ base, $Ba(Ti,Zr)O_3$ base, or $(Ba,Ca)TiO_3$ base. In an actual element body 3, each of the dielectric layers is integrated to such an extent that a boundary between the dielectric layers cannot be visually recognized. In the element body 3, the lamination direction of the plurality of dielectric layers may coincide with the second direction D2.

As illustrated in FIGS. 2 and 3, the multilayer capacitor C1 includes a plurality of internal electrodes 7 and a plurality of internal electrodes 9. Each of the internal electrodes 7 and 9 is an internal conductor disposed in the element body 3. Each of the internal electrodes 7 and 9 is made of a conductive material that is commonly used as an internal conductor of a multilayer electronic component. The conductive material includes, for example, a base metal. The conductive material includes, for example, Ni or Cu. Each of the internal electrodes 7 and 9 is configured as a sintered body of conductive paste containing the conductive material described above. In the present embodiment, the internal electrodes 7 and 9 are made of Ni. In the present embodiment, the internal electrodes 7 and 9 constitute a circuit element disposed in the element body 3.

The internal electrodes 7 and the internal electrodes 9 are disposed in different positions (layers) in the first direction D1. The internal electrodes 7 and the internal electrodes 9 are alternately disposed in the element body 3 to oppose each other in the first direction D1 with an interval therebetween. Polarities of the internal electrodes 7 and the internal electrodes 9 are different from each other. In a case in which the lamination direction of the plurality of dielectric layers is the second direction D2, the internal electrodes 7 and the internal electrodes 9 are disposed in different positions (layers) in the second direction D2. One end of each of the internal electrodes 7 and 9 is exposed to a corresponding end surface 3e of the pair of the end surfaces 3e. Each of the internal electrodes 7 and 9 includes the one end exposed to the corresponding end surface 3e.

The plurality of internal electrodes 7 and the plurality of internal electrodes 9 are alternately disposed in the first direction D1. The internal electrodes 7 and 9 are positioned in a plane approximately parallel to the principal surfaces 3a. The internal electrodes 7 and the internal electrodes 9 oppose each other in the first direction D1. The direction (s first direction D1) in which the internal electrodes 7 and the internal electrodes 9 oppose each other is orthogonal to the direction (second direction D2 and third direction D3) parallel to the principal surfaces 3a. In a case in which the lamination direction of the plurality of dielectric layers is the second direction D2, the plurality of internal electrodes 7 and the plurality of internal electrodes 9 are alternately disposed in the second direction D2. In this case, the internal electrodes 7 and 9 are positioned in a plane approximately orthogonal to the principal surfaces 3a. The internal electrodes 7 and the internal electrodes 9 oppose each other in the second direction D2.

The element body 3 includes an inner layer portion 4a and a pair of outer layer portions 4b. The plurality of internal electrodes 7 and 9 is disposed in the inner layer portion 4a. The inner layer portion 4a is positioned between the pair of outer layer portions 4b in the first direction D1. The pair of outer layer portions 4b sandwich the inner layer portion 4a therebetween in the first direction D1. None of the internal electrodes 7 and 9 are disposed in each of the outer layer portions 4b. In the present embodiment, a boundary between the outermost internal electrode 7 or 9 of the plurality of internal electrodes 7 and 9 in the first direction D1 and the outer layer portion 4b constitutes a boundary between the inner layer portion 4a and the outer layer portion 4b. In a case in which the inner layer portion 4a constitutes a first portion, for example, the outer layer portion 4b constitutes a second portion.

As illustrated in FIG. 1, the external electrodes 5 are disposed at both end portions of the element body 3 in the third direction D3. Each of the external electrodes 5 is disposed on the corresponding end surface 3e side of the element body 3. The external electrode 5 is disposed on at least the end surface 3e and the principal surface 3a that is also the side surface. In the present embodiment, each of the external electrode 5 is disposed on the pair of principal surface 3a, the pair of side surface 3c, and the end surface 3e. As illustrated in FIGS. 2 to 5, the external electrode 5 includes a plurality of electrode portions 5a, 5c, and 5e. Each of the electrode portions 5a is disposed on the principal surface 3a and the ridge portion 3g. Each of the electrode portions 5c is disposed on the side surface 3c and the ridge portion 3i. The electrode portion 5e is disposed on the corresponding end surface 3e. The external electrode 5 also includes electrode portions disposed on the ridge portions 3j.

The external electrode 5 is formed on the five surfaces, that is, the pair of principal surface 3a, the end surface 3e, and the pair of side surfaces 3c, as well as on the ridge portions 3g, 3i, and 3j. The electrode portions 5a, 5c, and 5e adjacent each other are coupled and are electrically connected to each other. Each electrode portion 5e covers all the one ends of the corresponding internal electrodes 7 or 9. The electrode portion 5e is directly connected to the corresponding internal electrodes 7 or 9. The external electrode 5 is electrically connected to the corresponding internal electrodes 7 or 9. As illustrated in FIGS. 4 and 5, the external electrode 5 includes a first electrode layer E1, a second electrode layer E2, a third electrode layer E3, and a fourth electrode layer E4. The fourth electrode layer E4 is arranged to constitute the outermost layer of the external electrode 5. Each of the electrode portions 5a, 5c, and 5e includes the first electrode layer E1, the second electrode layer E2, the third electrode layer E3, and the fourth electrode layer E4.

The first electrode layer E1 included in the electrode portion 5a is disposed on the ridge portion 3g, and is not disposed on the principal surface 3a. The first electrode layer E1 included in the electrode portion 5a is formed to cover the entire ridge portion 3g. The first electrode layer E1 is not formed on the principal surface 3a. The first electrode layer E1 included in the electrode portion 5a is in contact with the entire ridge portion 3g. The principal surface 3a is not covered with the first electrode layer E1, and is exposed from the first electrode layer E1. The first electrode layer E1 included in the electrode portion 5a may be disposed on the principal surface 3a. In this case, the first electrode layer E1 included in the electrode portion 5a is formed to cover one part of the principal surface 3a and the entire ridge portion 3g. That is, the first electrode layer E1 included in the electrode portion 5a is also in contact with the one part of the principal surface 3a. The one part of the principal surface 3a is, for example, the partial region near the end surface 3e, in the principal surface 3a.

The second electrode layer E2 included in the electrode portion 5a is disposed on the first electrode layer E1 and on the principal surface 3a. In the electrode portion 5a, the second electrode layer E2 covers the entire first electrode layer E1. In the electrode portion 5a, the second electrode layer E2 is in contact with the entire first electrode layer E1. The second electrode layer E2 included in the electrode portion 5a is in contact with one part of the principal surface 3a. The one part of the principal surface 3a is, for example, the partial region near the end surface 3e, in the principal surface 3a. That is, the one part of the principal surface 3a is close to the end surface 3e. The electrode portion 5a is four-layered on the ridge portion 3g, and is three-layered on the principal surface 3a. The second electrode layer E2 included in the electrode portion 5a is formed to cover the one part of the principal surface 3a and the entire ridge portion 3g. As described above, the one part of the principal surface 3a is, for example, the partial region near the end surface 3e, in the principal surface 3a. The second electrode layer E2 included in the electrode portion 5a indirectly covers the entire ridge portion 3g and the one part of the principal surface 3a in such a manner that the first electrode layer E1 is positioned between the second electrode layer E2 and the element body 3. The second electrode layer E2 included in the electrode portion 5a directly covers the one part of the principal surface 3a. The second electrode layer E2 included in the electrode portion 5a directly covers an entire portion of the first electrode layer E1 formed on the ridge portion 3g. In a case in which the first electrode layer E1 included in the electrode portion 5a is disposed on the principal surface 3a, the electrode portion 5a is four-layered on the principal surface 3a and the ridge portion 3g.

The first electrode layer E1 included in the electrode portion 5c is disposed on the ridge portion 3i, and is not disposed on the side surface 3c. The first electrode layer E1 included in the electrode portion 5c is formed to cover the entire ridge portion 3i. The first electrode layer E1 is not formed on the side surface 3c. The first electrode layer E1 included in the electrode portion 5c is in contact with the entire ridge portion 3i. The side surface 3c is not covered with the first electrode layer E1, and is exposed from the first electrode layer E1. The first electrode layer E1 included in the electrode portion 5c may be disposed on the side surface 3c. In this case, the first electrode layer E1 included in the electrode portion 5c is formed to cover one part of the side surface 3c and the entire ridge portion 3i. That is, the first electrode layer E1 included in the electrode portion 5c is also in contact with the one part of the side surface 3c. The one part of the side surface 3c is, for example, the partial region near the end surface 3e, in the side surface 3c.

The second electrode layer E2 included in the electrode portion 5c is disposed on the first electrode layer E1 and on the side surface 3c. In the electrode portion 5c, the second electrode layer E2 covers the entire first electrode layer E1. In the electrode portion 5c, the second electrode layer E2 is in contact with the entire first electrode layer E1. The second electrode layer E2 is in contact with one part of the side surface 3c. The one part of the side surface 3c is, for example, a partial region near the end surface 3e, in the side surface 3c. That is, the one part of the side surface 3c is close to the end surface 3e. The electrode portion 5c is four-layered on the ridge portion 3i, and is three-layered on the side surface 3c. The second electrode layer E2 included in the electrode portion 5c is formed to cover the entire ridge portion 3i and the one part of the side surface 3c. As described above, the one part of the side surface 3c is, for example, the partial region near the end surface 3e, in the side surface 3c. The second electrode layer E2 included in the electrode portion 5c indirectly covers the entire ridge portion 3i and the one part of the side surface 3c in such a manner that the first electrode layer E1 is positioned between the second electrode layer E2 and the element body 3. The second electrode layer E2 included in the electrode portion 5c directly covers the one part of the side surface 3c. The second electrode layer E2 included in the electrode portion 5c directly covers the entire portion of the first electrode layer E1 formed on the ridge portion 3i. In a case where the first electrode layer E1 included in the electrode portion 5c is disposed on the side surface 3c, the electrode portion 5c is four-layered on the side surface 3c and the ridge portion 3i.

The second electrode layer E2 included in the electrode portion 5c may be formed to cover one part of the ridge portion 3i and one part of the side surface 3c. The one part of the ridge portion 3i is, for example, a partial region near the principal surface 3a, in the ridge portion 3i. The one part of the side surface 3c is, for example, a corner region near the principal surface 3a and the end surface 3e, in the side surface 3c. In this case, the second electrode layer E2 included in the electrode portion 5c indirectly covers the one part of the ridge portion 3i in such a manner that the first electrode layer E1 is positioned between the second electrode layer E2 and the ridge portion 3i. The second electrode layer E2 included in the electrode portion 5c directly covers the one part of the side surface 3c. The second electrode layer E2 included in the electrode portion 5c directly covers a part of the portion of the first electrode layer E1 formed on the ridge portion 3i. That is, the electrode portion 5c includes a region where the first electrode layer E1 is exposed from the second electrode layer E2 and a region where the first electrode layer E1 is covered with the second electrode layer E2. In a case where the second electrode layer E2 of the electrode portion 5c is formed to cover the one part of the ridge portion 3i and the one part of the side surface 3c, as described above, the internal electrodes 7 and the internal electrodes 9 may be disposed in different positions (layers) in the second direction D2.

The first electrode layer E1 included in the electrode portion 5e is disposed on the end surface 3e. The end surface 3e is entirely covered with the first electrode layer E1. The first electrode layer E1 included in the electrode portion 5e is in contact with the entire end surface 3e. The second electrode layer E2 included in the electrode portion 5e is disposed on the first electrode layer E1. In the electrode portion 5e, the second electrode layer E2 is in contact with the entire first electrode layer E1. The second electrode layer E2 included in the electrode portion 5e is formed to cover the entire end surface 3e. The second electrode layer E2 included in the electrode portion 5e indirectly covers the entire end surface 3e in such a manner that the first electrode layer E1 is positioned between the second electrode layer E2 and the end surface 3e. The second electrode layer E2 included in the electrode portion 5e directly covers the entire first electrode layer E1. In the electrode portion 5e, the first electrode layer E1 is formed on the end surface 3e to be coupled to the one ends of the corresponding internal electrodes 7 or 9.

The second electrode layer E2 included in the electrode portion 5e may be formed to cover one part of the end surface 3e. The one part of the end surface 3e is, for example, a partial region near the principal surface 3a, in the end surface 3e. In this case, the second electrode layer E2 included in the electrode portion 5e indirectly covers the one part of the end surface 3e in such a manner that the first electrode layer E1 is positioned between the second electrode layer E2 and the end surface 3e. The second electrode layer E2 included in the electrode portion 5e directly covers a part of the portion of the first electrode layer E1 formed on the end surface 3e. That is, the electrode portion 5e includes a region where the first electrode layer E1 is exposed from the second electrode layer E2 and a region where the first electrode layer E1 is covered with the second electrode layer E2. In a case where the second electrode layer E2 of the electrode portion 5c is formed to cover the one part of the side surface 3e, as described above, the internal electrodes 7 and the internal electrodes 9 may be disposed in different positions (layers) in the second direction D2.

The first electrode layer E1 is formed by sintering conductive paste applied onto a surface of the element body 3. The first electrode layer E1 is formed to cover the end surface 3e and the ridge portions 3g, 3i, and 3j. The first electrode layer E1 is formed by sintering a metal component (metal powder) contained in the conductive paste. The first electrode layer E1 includes a sintered metal layer. The first electrode layer E1 includes a sintered metal layer formed on the element body 3. In the present embodiment, the first electrode layer E1 is a sintered metal layer made of Cu. The first electrode layer E1 may be a sintered metal layer made of Ni. The first electrode layer E1 contains a base metal. The conductive paste contains, for example, powder made of Cu or Ni, a glass component, an organic binder, and an organic solvent. The first electrode layer E1 included in the electrode portion 5a, the first electrode layer E1 included in the electrode portion 5c, and the first electrode layer E1 included in the electrode portion 5e are integrally formed.

The second electrode layer E2 is formed by curing conductive resin paste applied onto the first electrode layer E1, the principal surface 3a, and the pair of side surfaces 3c. The second electrode layer E2 is formed over the first electrode layer E1 and the element body 3. The first electrode layer E1 is an underlying metal layer for forming the second electrode layer E2. The second electrode layer E2 is a conductive resin layer covering the first electrode layer E1. The second electrode layer E2 includes a conductive resin layer. The conductive resin paste contains, for example, a resin, a conductive material, and an organic solvent. The resin is, for example, a thermosetting resin. The conductive material includes, for example, metal powder. The metal powder includes, for example, Ag powder or Cu powder. The thermosetting resin includes, for example, a phenolic resin, an acrylic resin, a silicone resin, an epoxy resin, or a polyimide resin. The second electrode layer E2 is in contact with the partial region of the ridge portion 3$j$. The second electrode layer E2 included in the electrode portion 5$a$, the second electrode layer E2 included in the electrode portion 5$c$, and the second electrode layer E2 included in the electrode portion 5$e$ are integrally formed.

The third electrode layer E3 is formed on the second electrode layer E2 by plating method. In the present embodiment, the third electrode layer E3 is formed on the second electrode layer E2 by Ni plating. The third electrode layer E3 is a Ni plating layer. The third electrode layer E3 may be an Sn plating layer, a Cu plating layer, or an Au plating layer. The third electrode layer E3 contains Ni, Sn, Cu, or Au. The Ni plating layer has better solder leach resistance than the metal contained in the second electrode layer E2. The third electrode layer E3 covers the second electrode layer E2.

The fourth electrode layer E4 is formed on the third electrode layer E3 by plating method. The fourth electrode layer E4 includes a solder plating layer. In the present embodiment, the fourth electrode layer E4 is formed on the third electrode layer E3 by Sn plating. The fourth electrode layer E4 is an Sn plating layer. The fourth electrode layer E4 may be an Sn—Ag alloy plating layer, an Sn—Bi alloy plating layer, or an Sn—Cu alloy plating layer. The fourth electrode layer E4 contains Sn, Sn—Ag alloy, Sn—Bi alloy, or Sn—Cu alloy.

The third electrode layer E3 and the fourth electrode layer E4 constitute a plating layer PL formed on the second electrode layer E2. In the present embodiment, the plating layer PL formed on the second electrode layer E2 is two-layered. The plating layer PL covers the second electrode layer E2. The third electrode layer E3 is an intermediate plating layer positioned between the fourth electrode layer E4 arranged to constitute the outermost layer and the second electrode layer E2. The third electrode layer E3 included in the electrode portion 5$a$, the third electrode layer E3 included in the electrode portion 5$c$, and the third electrode layer E3 included in the electrode portion 5$e$ are integrally formed. The fourth electrode layer E4 included in the electrode portion 5$a$, the fourth electrode layer E4 included in the electrode portion 5$c$, and the fourth electrode layer E4 included in the electrode portion 5$e$ are integrally formed.

As illustrated in FIG. 4, the second electrode layer E2 includes a region $E2_1$ positioned on the end surface 3$e$, a region $E2_2$ positioned on each of the principal surfaces 3$a$, and a region $E2_3$ positioned on each of the ridge portions 3$g$. The region $E2_1$ includes the second electrode layer E2 of the electrode portion 5$e$. The region $E2_2$ and the region $E2_3$ include the second electrode layer E2 of the electrode portion 5$a$. The region $E2_3$ is positioned between the region $E2_1$ and the region $E2_2$. The region $E2_3$ couples the region $E2_1$ and the region $E2_2$. The region $E2_1$ and the region $E2_3$ are continuous, and the region $E2_2$ and the region $E2_3$ are continuous. The second electrode layer E2 is disposed over the end surface 3$e$ and the principal surface 3$a$. In a case where the region $E2_1$ constitutes a first region, for example, the region $E2_2$ constitutes a second region and the region $E2_3$ constitutes a third region.

A maximum thickness T1 (μm) of the region $E2_1$ and a maximum thickness T2 (μm) of the region $E2_2$ satisfy a relation of $$T2/T1 \geq 0.11.$$

The maximum thickness T1 and the maximum thickness T2 may satisfy a relation of $$T2/T1 \geq 0.13.$$

The maximum thickness T1 and a minimum thickness T3 (μm) of the region $E2_3$ satisfy a relation of $$T3/T1 \geq 0.11.$$

The maximum thickness T1 and the minimum thickness T3 may satisfy a relation of $$T3/T1 \geq 0.12.$$

The maximum thickness T1 is a maximum thickness of the second electrode layer E2 on the end surface 3$e$. The maximum thickness T2 is a maximum thickness of the second electrode layer E2 on the principal surface 3$a$. The minimum thickness T3 is a minimum thickness of the second electrode layer E2 on the ridge portion 3$g$.

The maximum thickness T1 and the maximum thickness T2 may satisfy a relation of $$T2/T1 \leq 0.54.$$

The maximum thickness T1 and the minimum thickness T3 may satisfy a relation of $$T3/T1 \leq 0.43.$$

A thickness T4 (μm) of the region $E2_1$ at a position corresponding to a boundary BP between the inner layer portion 4$a$ and the outer layer portion 4$b$ and the maximum thickness T1 of the region $E2_1$ satisfy a relation of $$T4/T1 \geq 0.11.$$

The thickness T4 and the maximum thickness T1 may satisfy a relation of $$T4/T1 \geq 0.26.$$

The thickness T4 and the maximum thickness T1 may satisfy a relation of $$T4/T1 \leq 0.55.$$

The maximum thickness T2, the minimum thickness T3, and the thickness T4 satisfy a relation of $$T4 > T2$$

and a relation of $$T4 > T3.$$

The maximum thickness T1, the maximum thickness T2, the minimum thickness T3, and the thickness T4 can be determined, for example, as follows.

A cross-sectional photograph of the multilayer capacitor C1 including the second electrode layer E2 is obtained. The cross-sectional photograph is obtained, for example, by capturing a cross-section of the multilayer capacitor C1 taken along a plane that is parallel to the pair of side surfaces 3$c$ and is equidistant from the pair of side surfaces 3$c$. Each of the thicknesses T1, T2, T3, and T4 of the second electrode layer E2 on the obtained cross-sectional photograph is calculated. The maximum thickness T1 is a maximum value of the thickness of the region $E2_1$ in the third direction D3. The maximum thickness T2 is a maximum value of the thickness of the region $E2_2$ in the first direction D1. The minimum thickness T3 is a minimum value of the thickness of the region E2₃. The thickness of the region E2₃ is, for example, a thickness of the ridge portion 3g in the normal direction.

As illustrated in FIG. 5, the second electrode layer E2 includes a region E2₄ positioned on each of the side surfaces 3c and a region E2₅ positioned on each of the ridge portions 3i. The region E2₄ and the region E2₅ include the second electrode layer E2 of the electrode portion 5c. The region E2₅ is positioned between the region E2₁ and the region E2₄. The region E2₅ couples the region E2₁ and the region E2₄. The region E2₁ and the region E2₅ are continuous, and the region E2₄ and the region E2₅ are continuous. The second electrode layer E2 is disposed over the end surface 3e and the side surface 3c. In a case where the region E2₁ constitutes the first region, for example, the region E2₄ constitutes a fourth region and the region E2₅ constitutes a fifth region.

A maximum thickness T1 (μm) of the region E2₁ and a maximum thickness T5 (μm) of the region E2₄ satisfy a relation of $$T5/T1 \geq 0.11.$$

The maximum thickness T1 and the maximum thickness T5 may satisfy a relation of $$T5/T1 \geq 0.13.$$

The maximum thickness T1 and a minimum thickness T6 (μm) of the region E2₅ satisfy a relation of $$T6/T1 \geq 0.11.$$

The maximum thickness T1 and the minimum thickness T6 may satisfy a relation of $$T6/T1 \geq 0.12.$$

The maximum thickness T5 is a maximum thickness of the second electrode layer E2 on the side surface 3c. The minimum thickness T6 is a minimum thickness of the second electrode layer E2 on the ridge portion 3i.

The maximum thickness T1 of the region E2₁ and the maximum thickness T5 of the region E2₄ may satisfy a relation of $$T5/T1 \leq 0.54.$$

The maximum thickness T1 of the region E2₁ and the minimum thickness T6 of the region E2₅ may satisfy a relation of $$T6/T1 \leq 0.43.$$

In the present embodiment, the maximum thickness T2 is equal to the maximum thickness T5, and the minimum thickness T3 is equal to the minimum thickness T6. The term "equal" herein does not necessarily mean only that values are matched. Even in a case where values include a slight difference in a predetermined range, a manufacturing error, or a measurement error, it can be defined that the values are equal to each other.

The maximum thickness T5, and the minimum thickness T6 can be determined, for example, as follows.

A cross-sectional photograph of the multilayer capacitor C1 including the second electrode layer E2 is obtained. The cross-sectional photograph is obtained, for example, by capturing a cross-section of the multilayer capacitor C1 taken along a plane that is parallel to the pair of principal surfaces 3a and is equidistant from the pair of principal surfaces 3a. Each of the thicknesses T5 and T6 of the second electrode layer E2 on the obtained cross-sectional photograph is calculated. The maximum thickness T5 is a maximum value of the thickness of the region E2₄ in the first direction D1. The minimum thickness T6 is a minimum value of the thickness of the region E2₅. The thickness of the region E2₅ is, for example, a thickness of the ridge portion 3i in the normal direction.

As illustrated in FIG. 4, in a cross-section orthogonal to the principal surface 3a and the end surface 3e, a surface of the region E2₂ curves in a convex shape in a direction away from the principal surface 3a. The thickness of the region E2₂ is gradually reduced from a position of the maximum thickness of the region E2₂ toward an end edge of the region E2₂. In the present embodiment, the surface of the region E2₂ curves due to the change in thickness of the region E2₂.

As illustrated in FIG. 5, in a cross-section orthogonal to the side surface 3c and the end surface 3e, a surface of the region E2₄ curves in a convex shape in a direction away from the side surface 3c. The thickness of the region E2₄ is gradually reduced from a position of the maximum thickness of the region E2₄ toward an end edge of the region E2₄. In the present embodiment, the surface of the region E2₄ curves due to the change in thickness of the region E2₄.

As illustrated in FIG. 6, when viewed from the first direction D1, the end edge of the region E2₂ curves. In the present embodiment, when viewed from the first direction D1, a length of the region E2₂ in the third direction D3 is larger at the center of the region E2₂ in the second direction D2 than in an end of the region E2₂ in the second direction D2. The length of the region E2₂ in the third direction D3 is largest at the center of the region E2₂ in the second direction D2, and is gradually reduced toward the end of the region E2₂ in the second direction D2.

As illustrated in FIG. 7, when viewed from the second direction D2, the end edge of the region E2₄ curves. In the present embodiment, when viewed from the second direction D2, a length of the region E2₄ in the third direction D3 is larger at the center of the region E2₄ in the first direction D1 than in an end of the region E2₄ in the first direction D1. The length of the region E2₄ in the third direction D3 is largest at the center of the region E2₄ in the first direction D1, and is gradually reduced toward the end of the region E2₄ in the first direction D1.

As illustrated in FIGS. 4 and 5, the plating layer PL (the third electrode layer E3 and the fourth electrode layer E4) includes a portion PL1 positioned on the region E2₂ and a portion PL2 positioned on the region E2₄. The portion PL1 includes an end edge PL1e. The portion PL2 includes an end edge PL2e. As illustrated in FIG. 4, a gap G1 is formed between the end edge PL1e and the element body 3 (principal surface 3a). As illustrated in FIG. 5, a gap G2 is formed between the end edge PL2e and the element body 3 (side surface 3c). A width of each of the gaps G1 and G2 is, for example, larger than 0 (zero) and equal to or smaller than 3 μm. The widths of the gaps G1 and G2 may be the same as each other. The widths of the gaps G1 and G2 may be different from each other.

The relationship among the maximum thickness T1, the maximum thickness T2, the minimum thickness T3, and the thickness T4 is described.

The inventors carried out the following experiment in order to clarify a range of the maximum thickness T1, a range of the maximum thickness T2, a range of the minimum thickness T3, and a range of the thickness T4. That it, the inventors prepared samples 1 to 11 that are different from one another in the maximum thickness T1, the maximum thickness T2, and the minimum thickness T3, and the thickness T4, and confirmed an incidence ratio of peel-off of the second electrode layer E2 in each of the samples 1 to 11. The result is illustrated in FIG. 8. FIG. 8 is a table illustrating the incidence ratio of the peel-off of the second electrode layer in each of the samples 1 to 11.

Each of the samples 1 to 11 is a lot including a plurality of specimens. As described below, the specimens of the samples 1 to 11 are multilayer capacitors having the same configuration as one another except for the thicknesses T1, T2, T3, and T4. In the specimens of the samples 1 to 11, the element body 3 has a height of 2.5 mm, a width of 2.5 mm, and a length of 3.2 mm.

Each of the specimens of the sample 1 has the maximum thickness T1 of 58 μm, the maximum thickness T2 of 23 μm, the minimum thickness T3 of 5 μm, and the thickness T4 of 5 μm.

Each of the specimens of the sample 2 has the maximum thickness T1 of 80 μm, the maximum thickness T2 of 9 μm, the minimum thickness T3 of 6 μm, and the thickness T4 of 10 μm.

Each of the specimens of the sample 3 has the maximum thickness T1 of 118 μm, the maximum thickness T2 of 13 μm, the minimum thickness T3 of 12 μm, and the thickness T4 of 14 μm.

Each of the specimens of the sample 4 has the maximum thickness T1 of 120 μm, the maximum thickness T2 of 13 μm, the minimum thickness T3 of 13 μm, and the thickness T4 of 12 μm.

Each of the specimens of the sample 5 has the maximum thickness T1 of 122 μm, the maximum thickness T2 of 15 μm, the minimum thickness T3 of 15 μm, and the thickness T4 of 13 μm.

Each of the specimens of the sample 6 has the maximum thickness T1 of 121 μm, the maximum thickness T2 of 16 μm, the minimum thickness T3 of 14 μm, and the thickness T4 of 31 μm.

Each of the specimens of the sample 7 has the maximum thickness T1 of 121 μm, the maximum thickness T2 of 17 μm, the minimum thickness T3 of 15 μm, and the thickness T4 of 47 μm.

Each of the specimens of the sample 8 has the maximum thickness T1 of 125 μm, the maximum thickness T2 of 25 μm, the minimum thickness T3 of 32 μm, and the thickness T4 of 33 μm.

Each of the specimens of the sample 9 has the maximum thickness T1 of 127 μm, the maximum thickness T2 of 43 μm, the minimum thickness T3 of 26 μm, and the thickness T4 of 53 μm.

Each of the specimens of the sample 10 has the maximum thickness T1 of 102 μm, the maximum thickness T2 of 52 μm, the minimum thickness T3 of 37 μm, and the thickness T4 of 54 μm.

Each of the specimens of the sample 11 has the maximum thickness T1 of 94 μm, the maximum thickness T2 of 51 μm, the minimum thickness T3 of 40 μm, and the thickness T4 of 52 μm.

The incidence ratio of the peel-off of the second electrode layer E2 was determined as follows.

As for each of the samples 1 to 11, twelve specimens were selected and the selected specimens were left in a thermo-hygrostat chamber for five hours. In the thermo-hygrostat chamber, the temperature is 121° C. and the relative humidity is 95%. After that, a reflow test was conducted three times on the specimens in a nitrogen atmosphere. In the reflow test, a peak temperature is 260° C.

After the reflow test, the specimens were cut along a plane orthogonal to the end surface 3e, and whether there is peel-off of the second electrode layer E2 in the cut surface was visually confirmed. The number of specimens in which peel-off occurs in the second electrode layer E2 was counted to calculate an incidence ratio (%) of the peel-off of the second electrode layer E2.

As a result of the experiment described above, as illustrated in FIG. 8, the inventors confirmed that, as compared with the samples 1 to 3, the incidence ratio of the peel-off of the second electrode layer E2 is significantly reduced in the samples 4 to 11. In the samples 6 to 10, there was no specimen in which peel-off occurs in the second electrode layer E2.

Description of the relationship among the maximum thickness T1, the maximum thickness T5, and the minimum thickness T6 is omitted. In the present embodiment, the maximum thickness T2 is equal to the maximum thickness T5, and the minimum thickness T3 is equal to the minimum thickness T6; therefore, it is clear that the relationship among the maximum thickness T1, the maximum thickness T5, and the minimum thickness T6 is similar to the relationship among the maximum thickness T1, the maximum thickness T2, and the minimum thickness T3.

The plating layer PL covering the second electrode layer E2 tends to be cohesive contact with the second electrode layer E2, but tends not to be cohesive contact with the element body 3. This forms the gap G1 between the end edge PL1e of the plating layer PL and the element body 3. Even in a case where the moisture absorbed by the resin included in the second electrode layer E2 is gasified, the gas generated from the moisture reaches the gap G1, and the gas is emitted outside the external electrode 5 through the gap G1. Since the gas generated from the moisture is emitted outside the external electrode 5, stress tends not to act on the second electrode layer E2.

In the multilayer capacitor C1, the maximum thickness T1 and the maximum thickness T2 satisfy the relation of $T2/T1 \geq 0.11$, and the maximum thickness T1 and the minimum thickness T3 satisfy the relation of $T3/T1 \geq 0.11$.

Therefore, the gas generated from the moisture absorbed by the resin of the region $E2_1$ passes through the region $E2_3$ and the region $E2_2$ to reach the gap G1 reliably. The region $E2_2$ is closer to the gap G1 than to the region $E2_1$. In a case in which the gas generated from the moisture absorbed by the resin of the region $E2_1$ reaches the gap G1 reliably, then the gas generated from the moisture absorbed by the resin of the region $E2_2$ also reaches the gap G1 reliably.

In the multilayer capacitor C1, the gas generated from the moisture absorbed by the resin of the second electrode layer E2 (the region $E2_1$) reaches the gap G1 reliably. The gas that has reached the gap G1 is emitted outside the external electrode 5, so that the stress tends not to act on the second electrode layer E2. Consequently, the multilayer capacitor C1 controls the peel-off of the second electrode layer E2.

In the multilayer capacitor C1, the maximum thickness T1 and the maximum thickness T2 satisfy a relation of $T2/T1 \geq 0.13$.

Therefore, the multilayer capacitor C1 controls the peel-off of the conductive resin layer reliably.

In the multilayer capacitor C1, the maximum thickness T1 and the minimum thickness T3 satisfy a relation of $T3/T1 \geq 0.12$.

Therefore, the multilayer capacitor C1 controls the peel-off of the conductive resin layer reliably.

The gap G1 is an outlet of the gas generated from the moisture absorbed by the resin of the second electrode layer E2, and is also an inlet of the moisture to the external electrode 5. The path through which the gas generated from the moisture absorbed by the resin of the region $E2_1$ reaches the gap G1 may serve as a path through which the moisture reaches the region $E2_1$. The moisture that has reached the region $E2_1$ is absorbed in the region $E2_1$. In this case, the gas generation amount may increase.

In the multilayer capacitor C1, since the maximum thickness T1 and the maximum thickness T2 satisfy the relation of $$T2/T1 \leq 0.54,$$

the moisture tends not to reach the region $E2_1$ even in a case in which the moisture enters from the gap G1. Therefore, the multilayer capacitor C1 reduces an increase in moisture absorbed in the second electrode layer E2 (the region $E2_1$) and an increase in gas generated from the moisture. Consequently, the multilayer capacitor C1 further controls the peel-off of the second electrode layer E2. In a case where the maximum thickness T1 and the maximum thickness T2 satisfy the relation of $$T2/T1 \leq 0.51,$$

the multilayer capacitor C1 controls the peel-off of the second electrode layer E2 more reliably.

In the multilayer capacitor C1, since the maximum thickness T1 and the minimum thickness T3 satisfy the relation of $$T3/T1 \leq 0.43,$$

the moisture tends not to reach the region $E2_1$ even in a case in which the moisture enters from the gap G1. Therefore, the multilayer capacitor C1 reduces an increase in moisture absorbed in the second electrode layer E2 (the region $E2_1$) and an increase in gas generated from the moisture. Consequently, the multilayer capacitor C1 further controls the peel-off of the second electrode layer E2. In a case where the maximum thickness T1 and the minimum thickness T3 satisfy the relation of $$T3/T1 \leq 0.36,$$

the multilayer capacitor C1 controls the peel-off of the second electrode layer E2 more reliably.

The position, in the region $E2_1$, corresponding to the boundary BP between the inner layer portion 4a and the outer layer portion 4b is a position near an end of the region $E2_1$ and is near the region $E2_3$. Therefore, in a case in which the gas tends to pass through the position of the second electrode layer E2 corresponding to the boundary BP, the gas tends to reach the region $E2_3$ from the region $E2_1$.

In the multilayer capacitor C1, since the maximum thickness T1 and the thickness T4 satisfy the relation of $$T4/T1 \geq 0.11,$$

the gas reaches the region $E2_3$ from the region $E2_1$ more reliably. Therefore, in the multilayer capacitor C1, the gas generated from the moisture absorbed by the resin of the second electrode layer E2 (the region $E2_1$) reaches the gap G1 more reliably. The stress further tends not to act on the second electrode layer E2. Consequently, the multilayer capacitor C1 further controls the peel-off of the second electrode layer E2.

In the multilayer capacitor C1, the maximum thickness T1 and the thickness T4 satisfy the relation of $$T4/T1 \geq 0.26.$$

Therefore, the multilayer capacitor C1 controls the peel-off of the second electrode layer E2 reliably.

As described above, the path through which the gas generated from the moisture absorbed by the resin of the region $E2_1$ reaches the gap G1 may serve as a path through which the moisture reaches the region $E2_1$.

In the multilayer capacitor C1, since the maximum thickness T1 and the above-described thickness T4 satisfy the relation of $$T4/T1 \leq 0.55,$$

the moisture tends not to reach the region $E2_1$ even in a case in which the moisture enters from the gap G1. Therefore, the multilayer capacitor C1 reduces an increase in moisture absorbed in the second electrode layer E2 (the region $E2_1$) and an increase in gas generated from the moisture. Consequently, the multilayer capacitor C1 further controls the peel-off of the second electrode layer E2. In a case where the maximum thickness T1 and the above-described thickness T4 satisfy the relation of $$T4/T1 \leq 0.53,$$

the multilayer capacitor C1 controls the peel-off of the second electrode layer E2 more reliably.

In the multilayer capacitor C1, since the maximum thickness T2, the minimum thickness T3, and the thickness T4 satisfy the relation of $$T4 > T2$$

and the relation of $$T4 > T3,$$

the gas reaches the region $E2_2$ from the region $E2_1$ more reliably. Therefore, in the multilayer capacitor C1, the gas generated from the moisture absorbed by the resin of the second electrode layer E2 (the region $E2_1$) reaches the gap G1 more reliably. The stress further tends not to act on the second electrode layer E2. Consequently, the multilayer capacitor C1 further controls the peel-off of the second electrode layer E2.

In the multilayer capacitor C1, in the cross-section orthogonal to the principal surface 3a and the end surface 3e, the surface of the region $E2_2$ curves in the convex shape in the direction away from the principal surface 3a.

In the configuration where the surface of the region $E2_2$ curves in the convex shape in the direction away from the principal surface 3a, since the thickness of the region $E2_2$ tends not to be small locally, a movement path of the gas in the region $E2_2$ tends not to be narrow on the movement path. Therefore, the multilayer capacitor C1 tends not to suppress the movement of the gas in the region $E2_2$. The gas generated from the moisture absorbed by the resin of the second electrode layer E2 reaches the gap G1 more reliably. Consequently, the multilayer capacitor C1 controls the peel-off of the second electrode layer E2 more reliably.

In the multilayer capacitor C1, in the cross-section orthogonal to the side surface 3c and the end surface 3e, the surface of the region $E2_4$ curves in the convex shape in the direction away from the side surface 3c.

In the configuration where the surface of the region $E2_4$ curves in the convex shape in the direction away from the side surface 3c, since the thickness of the region $E2_4$ tends not to be small locally, a movement path of the gas in the region $E2_4$ tends not to be narrow on the movement path. Therefore, the multilayer capacitor C1 tends not to suppress the movement of the gas in the region $E2_4$. The gas generated from the moisture absorbed by the resin of the second electrode layer E2 reaches the gap G2 more reliably. Consequently, the multilayer capacitor C1 controls the peel-off of the second electrode layer E2 more reliably.

In the multilayer capacitor C1, when viewed from the first direction D1, the end edge $Ee_2$ of the region $E2_2$ curves.

In the configuration where the end edge of the region $E2_2$ curves, the length of the end edge of the region $E2_2$ is larger than that of a configuration where the end edge of the region $E2_2$ has a linear shape. Therefore, in the multilayer capacitor C1, a region from which the gas is emitted is large, and the gas further tends to be emitted from the external electrode 5. Consequently, the stress further tends not to act on the second electrode layer E2.

In the multilayer capacitor C1, when viewed from the second direction D2, the end edge $Ee_2$ of the region $E2_4$ curves.

In the configuration where the end edge of the region $E2_4$ curves, the length of the end edge of the region $E2_4$ is larger than that of a configuration where the end edge of the region $E2_4$ has a linear shape. Therefore, in the multilayer capacitor C1, a region from which the gas is emitted is large, and the gas further tends to be emitted from the external electrode 5. Consequently, the stress further tends not to act on the second electrode layer E2.

In the multilayer capacitor C1, the maximum thickness T1 of the first region and the maximum thickness T5 of the second region satisfy the relation of $T5/T1 \geq 0.11$, and the maximum thickness T1 and the minimum thickness T6 of the third region satisfy the relation of $T6/T1 \geq 0.11$.

As described above, the gas generated from the moisture absorbed by the resin of the region $E2_1$ passes through the region $E2_5$ and the region $E2_4$ to reach the gap G2 reliably. The region $E2_4$ is closer to the gap G2 than to the region $E2_1$. In a case in which the gas generated from the moisture absorbed by the resin of the region $E2_1$ reaches the gap G2 reliably, then the gas generated from the moisture absorbed by the resin of the region $E2_4$ also reaches the gap G2 reliably.

In the multilayer capacitor C1, the gas generated from the moisture absorbed by the resin of the second electrode layer E2 (the region $E2_1$) reaches the gap G2 reliably. The gas that has reached the gap G2 is emitted outside the external electrode 5, so that the stress tends not to act on the second electrode layer E2. Consequently, the multilayer capacitor C1 further controls the peel-off of the second electrode layer E2.

In the multilayer capacitor C1, the maximum thickness T1 and the maximum thickness T5 satisfy a relation of $T5/T1 \geq 0.13$.

Therefore, the multilayer capacitor C1 further controls the peel-off of the conductive resin layer reliably.

In the multilayer capacitor C1, the maximum thickness T1 and the minimum thickness T6 satisfy a relation of $T6/T1 \geq 0.12$.

Therefore, the multilayer capacitor C1 further controls the peel-off of the conductive resin layer reliably.

The gap G2 is an outlet of the gas generated from the moisture absorbed by the resin of the second electrode layer E2, and is also an inlet of the moisture to the external electrode 5. The path through which the gas generated from the moisture absorbed by the resin of the region $E2_1$ reaches the gap G2 may serve as a path through which the moisture reaches the region $E2_1$. The moisture that has reached the region $E2_1$ is absorbed in the region $E2_1$. In this case, the gas generation amount may increase.

In the multilayer capacitor C1, since the maximum thickness T1 and the maximum thickness T5 satisfy the relation of $T5/T1 \leq 0.54$, the moisture tends not to reach the region $E2_1$ even in a case in which the moisture enters from the gap G2. Therefore, the multilayer capacitor C1 reduces an increase in moisture absorbed in the second electrode layer E2 (the region $E2_1$) and an increase in gas generated from the moisture. Consequently, the multilayer capacitor C1 further controls the peel-off of the second electrode layer E2. In a case where the maximum thickness T1 and the maximum thickness T5 satisfy the relation of $T5/T1 \leq 0.51$, the multilayer capacitor C1 controls the peel-off of the second electrode layer E2 more reliably.

In the multilayer capacitor C1, since the maximum thickness T1 and the minimum thickness T6 satisfy the relation of $T6/T1 \leq 0.43$, the moisture tends not to reach the region $E2_1$ even in a case in which the moisture enters from the gap G2. Therefore, the multilayer capacitor C1 reduces an increase in moisture absorbed in the second electrode layer E2 (the region $E2_1$) and an increase in gas generated from the moisture. Consequently, the multilayer capacitor C1 further controls the peel-off of the second electrode layer E2. In a case where the maximum thickness T1 and the minimum thickness T6 satisfy the relation of $T6/T1 \leq 0.36$, the multilayer capacitor C1 controls the peel-off of the second electrode layer E2 more reliably.

Figure 9:
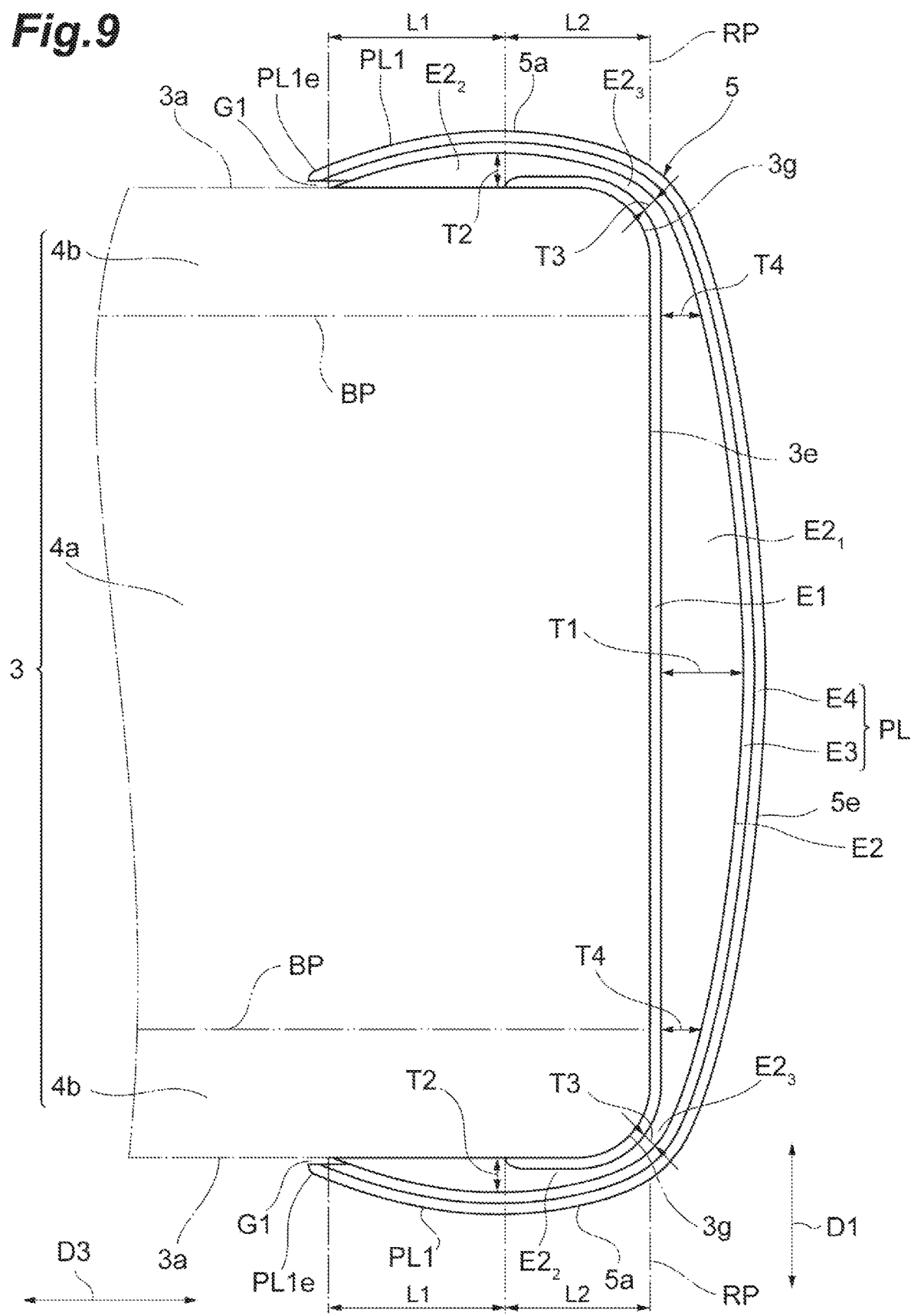
FIG. 9 is a view illustrating a cross-sectional configuration of an external electrode.
Figure 10:
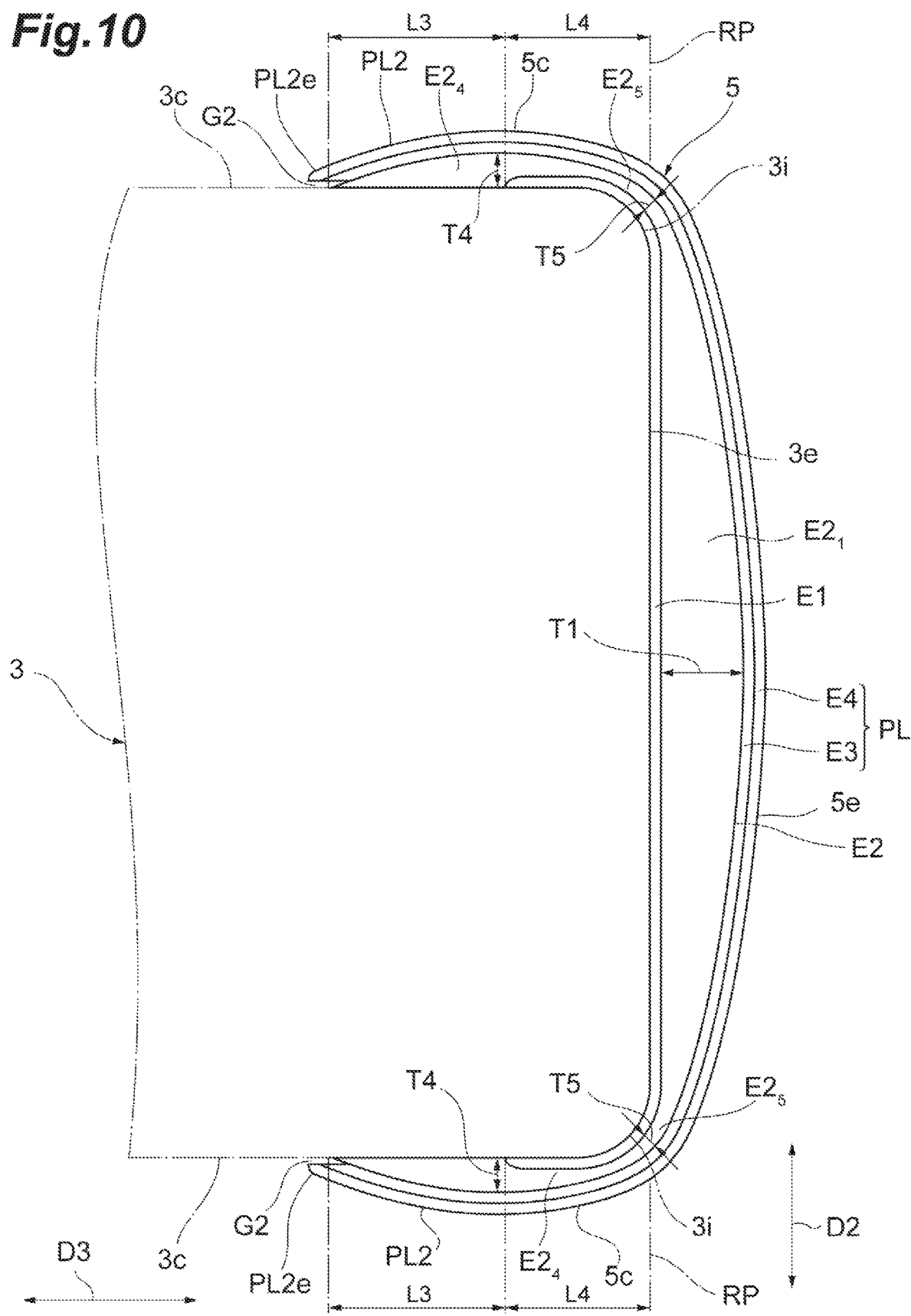
FIG. 10 is a view illustrating a cross-sectional configuration of the external electrode.

A configuration of a multilayer capacitor according to a modification of the present embodiment will be described with reference to FIGS. 9 and 10. FIGS. 9 and 10 are views illustrating a cross-sectional configuration of an external electrode. The multilayer capacitor according to the modification is generally similar to or the same as the multilayer capacitor C1 described above. However, the configuration of the first electrode layer E1 of the modification is different from that in the embodiment described above. Hereinafter, a difference between the embodiment and the modification will be mainly described.

The multilayer capacitor according to the modification includes the element body 3 and the plurality of external electrodes 5, as with the multilayer capacitor C1. Each of the external electrodes 5 includes the plurality of electrode portions 5a, 5c, and 5e. Each of the external electrodes 5 includes the first electrode layer E1, the second electrode layer E2, the third electrode layer E3, and the fourth electrode layer E4. The multilayer capacitor according to the modification also includes the plurality of internal electrodes 7 and the plurality of internal electrodes 9, although not illustrated in the drawing.

As illustrated in FIG. 9, the first electrode layer E1 of the electrode portion 5a is disposed on the principal surface 3a. The first electrode layer E1 of the electrode portion 5a is formed to cover a part of the principal surface 3a and the entirety of the ridge portion 3g. The first electrode layer E1 is disposed over the principal surface $3a$ and the end surface $3e$. The first electrode layer E1 of the electrode portion $5a$ is in contact with a part of the principal surface $3a$. The part of the principal surface $3a$ is, for example, the partial region close to the end surface $3e$, in the principal surface $3a$.

A length L1 from the end edge of the first electrode layer E1 to the end edge of the region $E2_2$ in the third direction D3 is larger than a length L2 from a reference plane RP to the end edge of the first electrode layer E1 in the third direction D3. The reference plane RP is a plane including the end surface $3e$.

Each of the lengths L1 and L2 can be determined, for example, as follows.

A cross-sectional photograph of the multilayer capacitor including the first electrode layer E1 and the second electrode layer E2 is obtained. The cross-sectional photograph is obtained, for example, by capturing a cross-section of the multilayer capacitor taken along a plane that is parallel to the pair of side surfaces $3c$ and is equidistant from the pair of side surfaces $3c$. Each of the lengths L1 and L2 on the obtained cross-sectional photograph is calculated.

As illustrated in FIG. 10, the first electrode layer E1 of the electrode portion $5c$ is also disposed on the side surface $3c$. The first electrode layer E1 of the electrode portion $5c$ is formed to cover a part of the side surface $3c$ and the entirety of the ridge portion $3i$. The first electrode layer E1 is disposed over the side surface $3c$ and the end surface $3e$. The first electrode layer E1 of the electrode portion $5c$ is in contact with a part of the side surface $3c$. The part of the side surface $3c$ is, for example, the partial region close to the end surface $3e$, in the side surface $3c$.

A length L3 from the end edge of the first electrode layer E1 to the end edge of the region $E2_4$ in the third direction D3 is larger than a length L4 from a reference plane RP to the end edge of the first electrode layer E1 in the third direction D3. The reference plane RP is a plane including the end surface $3e$.

Each of the lengths L3 and L4 can be determined, for example, as follows.

A cross-sectional photograph of the multilayer capacitor including the first electrode layer E1 and the second electrode layer E2 is obtained. The cross-sectional photograph is obtained, for example, by capturing a cross-section of the multilayer capacitor taken along a plane that is parallel to the pair of principal surfaces $3a$ and is equidistant from the pair of principal surfaces $3a$. Each of the lengths L3 and L4 on the obtained cross-sectional photograph is calculated.

The degree of cohesive contact between the element body 3 and the second electrode layer E2 is lower than the degree of cohesive contact between the first electrode layer E1 and the second electrode layer E2. Therefore, an interface between the first electrode layer E1 and the second electrode layer E2 tends not to contribute to the movement path of the gas, and an interface between the element body 3 and the second electrode layer E2 tends to contribute as the movement path of the gas.

The configuration where the length L1 is larger than the length L2 has more movement paths of the gas than a configuration where the length L1 is equal to or smaller than the length L2. In the present modification, the gas generated from the moisture absorbed by the resin of the second electrode layer E2 tends to move toward a gap G1. Therefore, the stress further tends not to act on the second electrode layer E2. Consequently, the present modification further controls the peel-off of the second electrode layer E2.

The configuration where the length L3 is larger than the length L4 has more movement paths of the gas than a configuration where the length L3 is equal to or smaller than the length L4. In the present modification, the gas generated from the moisture absorbed by the resin of the second electrode layer E2 tends to move toward a gap G2. Therefore, the stress further tends not to act on the second electrode layer E2. Consequently, the present modification further controls the peel-off of the second electrode layer E2.

In the present specification, in a case in which an element is described as being disposed on another element, the element may be directly disposed on the other element or be indirectly disposed on the other element. In a case in which an element is indirectly disposed on another element, an intervening element is present between the element and the other element. In a case in which an element is directly disposed on another element, no intervening element is present between the element and the other element.

In the present specification, in a case in which an element is described as being positioned on another element, the element may be directly positioned on the other element or be indirectly positioned on the other element. In a case in which an element is indirectly positioned on another element, an intervening element is present between the element and the other element. In a case in which an element is directly positioned on another element, no intervening element is present between the element and the other element.

In the present specification, in a case in which an element is described as covering another element, the element may directly cover the other element or indirectly cover the other element. In a case in which an element indirectly covers another element, an intervening element is present between the element and the other element. In a case in which an element directly covers another element, no intervening element is present between the element and the other element.

Although the embodiment and modification of the present invention have been described above, the present invention is not necessarily limited to the embodiments and modifications, and the embodiment can be variously changed without departing from the scope of the invention.

The maximum thickness T1 and the maximum thickness T5 may not satisfy the relation of $$T5/T1 \geq 0.11.$$

The maximum thickness T1 and the minimum thickness T6 may not satisfy the relation of $$T6/T1 \geq 0.11.$$

As long as the maximum thickness T1 and the maximum thickness T2 satisfy the relation of $$T2/T1 \geq 0.11, \text{ and}$$

the maximum thickness T1 and the minimum thickness T3 satisfy the relation of $$T3/T1 \geq 0.11,$$

the multilayer capacitor C1 controls the peel-off of the second electrode layer E2.

The maximum thickness T1 and the maximum thickness T5 may not satisfy the relation of $$T5/T1 \leq 0.54.$$

As long as the maximum thickness T1 and the maximum thickness T2 satisfy the relation of $$T2/T1 \leq 0.54,$$

the multilayer capacitor C1 further controls the peel-off of the second electrode layer E2.

The maximum thickness T1 and the minimum thickness T6 may not satisfy the relation of $T6/T1 \leq 0.43$.

As long as the maximum thickness T1 and the minimum thickness T3 satisfy the relation of $T3/T1 \leq 0.43$, the multilayer capacitor C1 further controls the peel-off of the second electrode layer E2.

The maximum thickness T2 of the region $E2_2$ positioned on one of the pair of principal surfaces 3a and the maximum thickness T1 may satisfy the relation of $T2/T1 \geq 0.11$, and the minimum thickness T3 of the region $E2_3$ positioned on the ridge portion 3g between the one of the pair of principal surfaces 3a and the end surface 3e and the maximum thickness T1 may satisfy the relation of $T3/T1 \geq 0.11$.

In a case where the maximum thickness T2 of each of the regions $E2_2$ and the maximum thickness T1 satisfy the relation of $T2/T1 \geq 0.11$, and where the maximum thickness T3 of each of the regions $E2_3$ and the minimum thickness T1 satisfy the relation of $T3/T1 \geq 0.11$, the multilayer capacitor C1 further controls the peel-off of the second electrode layer E2.

The maximum thickness T2 of the region $E2_2$ positioned on the one of the pair of principal surfaces 3a and the maximum thickness T1 may satisfy the relation of $T2/T1 \leq 0.54$.

In a case where the maximum thickness T2 of each of the regions $E2_2$ and the maximum thickness T1 satisfy the relation of $T2/T1 \leq 0.54$, the multilayer capacitor C1 further controls the peel-off of the second electrode layer E2.

The minimum thickness T3 of the region $E2_3$ positioned on the ridge portion 3g between the one of the pair of principal surfaces 3a and the end surface 3e and the maximum thickness T1 may satisfy the relation of $T3/T1 \leq 0.43$.

In a case where the minimum thickness T3 of each of the regions $E2_3$ and the maximum thickness T1 satisfy the relation of $T3/T1 \leq 0.43$, the multilayer capacitor C1 further controls the peel-off of the second electrode layer E2.

In a cross-section orthogonal to the principal surface 3a and the end surface 3e, the surface of the region $E2_2$ may not curve in a convex shape in a direction away from the principal surface 3a. In a case where, in the cross-section orthogonal to the principal surface 3a and the end surface 3e, the surface of the region $E2_2$ curves in a convex shape in the direction away from the principal surface 3a, the multilayer capacitor C1 controls the peel-off of the second electrode layer E2 more reliably as described above.

In a cross-section orthogonal to the side surface 3c and the end surface 3e, the surface of the region $E2_4$ may not curve in a convex shape in a direction away from the principal surface 3a. In a case where, in the cross-section orthogonal to the side surface 3c and the end surface 3e, the surface of the region $E2_4$ curves in a convex shape in the direction away from the principal surface 3a, the multilayer capacitor C1 controls the peel-off of the second electrode layer E2 more reliably as described above.

When viewed from the first direction D1, the end edge of the region $E2_2$ may not curve. In a case where, when viewed from the first direction D1, the end edge of the region $E2_2$ curves, the stress further tends not to act on the second electrode layer E2 as described above.

When viewed from the second direction D2, the end edge of the region $E2_4$ may not curve. In a case where, when viewed from the second direction D2, the end edge of the region $E2_4$ curves, the stress further tends not to act on the second electrode layer E2 as described above.

The electronic components of the present embodiment and modification are the multilayer capacitors. Applicable electronic component is not limited to the multilayer capacitor. Examples of the applicable electronic components include, but not limited to, multilayer electronic components such as a multilayer inductor, a multilayer varistor, a multilayer piezoelectric actuator, a multilayer thermistor, or a multilayer composite component, and electronic components other than the multilayer electronic components.

What is claimed is:

1. An electronic component comprising:
   an element body including a side surface and an end surface, the side surface and the end surface being adjacent to each other; and
   an external electrode disposed on the side surface and the end surface, the external electrode including:
     a conductive resin layer disposed over the side surface and the end surface, the conductive resin layer including a first region positioned on the end surface, a second region positioned on the side surface, and a third region positioned on a ridge portion between the end surface and the side surface; and
     a plating layer covering the conductive resin layer,
   wherein in a case where a maximum thickness of the first region is T1 (μm), a maximum thickness of the second region is T2 (μm), and a minimum thickness of the third region is T3 (μm),
   the maximum thickness T1 and the maximum thickness T2 satisfy a relation of $T2/T1 \geq 0.11$, the maximum thickness T1 and the minimum thickness T3 satisfy a relation of $T3/T1 \geq 0.11$, and the maximum thickness T1 and the maximum thickness T2 satisfy a relation of $T2/T1 \leq 0.54$.

2. The electronic component according to claim 1, wherein
   the maximum thickness T1 and the maximum thickness T2 satisfy a relation of $T2/T1 \geq 0.13$.

3. The electronic component according to claim 1, wherein
   the maximum thickness T1 and the minimum thickness T3 satisfy a relation of $T3/T1 \geq 0.12$.

4. The electronic component according to claim 1, wherein
the maximum thickness T1 and the minimum thickness T3 satisfy a relation of $T3/T1 \leq 0.43$.

5. The electronic component according to claim 1, further comprising
a circuit element disposed in the element body, wherein
the element body includes a first portion where the circuit element is disposed and a second portion where the circuit element is not disposed, and
in a case where a thickness of the first region at a position corresponding to a boundary between the first portion and the second portion is T4 (μm), the maximum thickness T1 and the thickness T4 satisfy a relation of $T4/T1 \geq 0.11$.

6. The electronic component according to claim 5, wherein
the maximum thickness T1 and the thickness T4 satisfy a relation of $T4/T1 \geq 0.26$.

7. The electronic component according to claim 5, wherein
the maximum thickness T1 and the thickness T4 satisfy a relation of $T4/T1 \leq 0.55$.

8. The electronic component according to claim 5, wherein
the maximum thickness T2, the minimum thickness T3, and the thickness T4 satisfy a relation of $T4 > T2$ and a relation of $T4 > T3$.

9. The electronic component according to claim 1, wherein,
in a cross-section orthogonal to the side surface and the end surface, a surface of the second region curves in a convex shape in a direction away from the side surface.

10. The electronic component according to claim 1, wherein
the external electrode further includes a sintered metal layer, the sintered metal layer being disposed over the side surface and the end surface and being covered with the conductive resin layer, and
with a plane including the end surface as a reference plane, a length from an end edge of the sintered metal layer to an end edge of the second region in a direction orthogonal to the end surface is larger than a length from the reference plane to the end edge of the sintered metal layer in the direction orthogonal to the end surface.

11. The electronic component according to claim 1, wherein,
when viewed from a direction orthogonal to the side surface, an end edge of the second region curves.

12. An electronic component comprising:
an element body including a side surface and an end surface, the side surface and the end surface being adjacent to each other; and
an external electrode disposed on the side surface and the end surface, the external electrode including:
a conductive resin layer disposed over the side surface and the end surface, the conductive resin layer including a first region positioned on the end surface, a second region positioned on the side surface, and a third region positioned on a ridge portion between the end surface and the side surface; and
a plating layer covering the conductive resin layer,
wherein in a case where a maximum thickness of the first region is T1 (μm), a maximum thickness of the second region is T2 (μm), and a minimum thickness of the third region is T3 (μm),
the maximum thickness T1 and the maximum thickness T2 satisfy a relation of $T2/T1 \geq 0.11$, the maximum thickness T1 and the minimum thickness T3 satisfy a relation of $T3/T1 \geq 0.11$, and the maximum thickness T1 and the minimum thickness T3 satisfy a relation of $T3/T1 \leq 0.43$.

13. An electronic component comprising:
an element body including a side surface and an end surface, the side surface and the end surface being adjacent to each other;
a circuit element disposed in the element body; and
an external electrode disposed on the side surface and the end surface, the external electrode including:
a conductive resin layer disposed over the side surface and the end surface, the conductive resin layer including a first region positioned on the end surface, a second region positioned on the side surface, and a third region positioned on a ridge portion between the end surface and the side surface; and
a plating layer covering the conductive resin layer,
wherein the element body includes a first portion where the circuit element is disposed and a second portion where the circuit element is not disposed, and
in a case where a maximum thickness of the first region is T1 (μm), a maximum thickness of the second region is T2 (μm), and a minimum thickness of the third region is T3 (μm),
the maximum thickness T1 and the maximum thickness T2 satisfy a relation of $T2/T1 \geq 0.11$, the maximum thickness T1 and the minimum thickness T3 satisfy a relation of $T3/T1 \geq 0.11$, in a case where a thickness of the first region at a position corresponding to a boundary between the first portion and the second portion is T4 (μm), the maximum thickness T1 and the thickness T4 satisfy a relation of $T4/T1 \geq 0.11$, and the maximum thickness T1 and the thickness T4 satisfy a relation of $T4/T1 \leq 0.55$.

14. The electronic component according to claim 13, wherein
the maximum thickness T1 and the maximum thickness T2 satisfy a relation of $T2/T1 \geq 0.13$.

15. The electronic component according to claim 13, wherein
the maximum thickness T1 and the minimum thickness T3 satisfy a relation of $T3/T1 \geq 0.12$.

16. The electronic component according to claim 13, wherein
the maximum thickness T1 and the thickness T4 satisfy a relation of $T4/T1 \geq 0.26$.

17. The electronic component according to claim 13, wherein
the maximum thickness T2, the minimum thickness T3, and the thickness T4 satisfy a relation of $T4 > T2$ and a relation of $T4 > T3$.

18. The electronic component according to claim 13, wherein,
in a cross-section orthogonal to the side surface and the end surface, a surface of the second region curves in a convex shape in a direction away from the side surface.

19. The electronic component according to claim 13, wherein
the external electrode further includes a sintered metal layer, the sintered metal layer being disposed over the side surface and the end surface and being covered with the conductive resin layer, and
with a plane including the end surface as a reference plane, a length from an end edge of the sintered metal layer to an end edge of the second region in a direction orthogonal to the end surface is larger than a length from the reference plane to the end edge of the sintered metal layer in the direction orthogonal to the end surface.

20. The electronic component according to claim 13, wherein,
when viewed from a direction orthogonal to the side surface, an end edge of the second region curves.

21. An electronic component comprising:
an element body including a side surface and an end surface, the side surface and the end surface being adjacent to each other;
a circuit element disposed in the element body; and
an external electrode disposed on the side surface and the end surface, the external electrode including:
a conductive resin layer disposed over the side surface and the end surface, the conductive resin layer including a first region positioned on the end surface, a second region positioned on the side surface, and a third region positioned on a ridge portion between the end surface and the side surface; and
a plating layer covering the conductive resin layer,
wherein the element body includes a first portion where the circuit element is disposed and a second portion where the circuit element is not disposed,
in a case where a maximum thickness of the first region is T1 (μm), a maximum thickness of the second region is T2 (μm), and a minimum thickness of the third region is T3 (μm),
the maximum thickness T1 and the maximum thickness T2 satisfy a relation of $T2/T1 \geq 0.11$, the maximum thickness T1 and the minimum thickness T3 satisfy a relation of $T3/T1 \geq 0.11$, and in a case where a thickness of the first region at a position corresponding to a boundary between the first portion and the second portion is T4 (μm), the maximum thickness T1 and the thickness T4 satisfy a relation of $T4/T1 \geq 0.11$, and the maximum thickness T2, the minimum thickness T3, and the thickness T4 satisfy a relation of $T4 > T2$ and a relation of $T4 > T3$.

* * * * *